(12) United States Patent
McLaurine, II et al.

(10) Patent No.: US 11,612,867 B1
(45) Date of Patent: Mar. 28, 2023

(54) VORTEX SPIRIT BOTTLE

(71) Applicant: Tremark Development LLC, Terre Haute, IN (US)

(72) Inventors: Mark McLaurine, II, Terre Haute, IN (US); Christopher Thomas Tooley, Terre Haute, IN (US)

(73) Assignee: Tremark Development LLC, Terre Haute, IN (US)

( * ) Notice: Subject to any disclaimer, the term of this patent is extended or adjusted under 35 U.S.C. 154(b) by 0 days.

(21) Appl. No.: 17/661,204

(22) Filed: Apr. 28, 2022

Related U.S. Application Data

(63) Continuation-in-part of application No. 29/829,644, filed on Mar. 7, 2022.

(51) Int. Cl.
*B01F 33/452* (2022.01)

(52) U.S. Cl.
CPC .................. *B01F 33/452* (2022.01)

(58) Field of Classification Search
CPC . B01F 33/452; B01F 23/2361; B01F 2101/17
See application file for complete search history.

(56) References Cited

U.S. PATENT DOCUMENTS

| | | | | |
|---|---|---|---|---|
| 4,162,855 | A * | 7/1979 | Bender | A47J 43/0465 366/274 |
| 6,332,706 | B1 | 12/2001 | Hall | |
| 10,076,734 | B2 | 9/2018 | Cysewski et al. | |
| 10,160,940 | B2 | 12/2018 | Cifaldi | |
| 2014/0334249 | A1* | 11/2014 | Radow | B01F 33/452 366/273 |
| 2018/0199760 | A1 | 7/2018 | Rai | |
| 2018/0221836 | A1* | 8/2018 | Ni | B01F 35/2115 |
| 2020/0122992 | A1* | 4/2020 | Lyons | B65D 47/127 |
| 2020/0157482 | A1* | 5/2020 | Levin | B01F 23/238 |
| 2020/0238239 | A1 | 7/2020 | Shotey et al. | |

OTHER PUBLICATIONS

McLaurine II, Design U.S. Appl. No. 29/781,063, 11 pages, filed Apr. 28, 2021.

* cited by examiner

*Primary Examiner* — Elizabeth Insler
(74) *Attorney, Agent, or Firm* — Woodard, Emhardt, Henry, Reeves & Wagner, LLP

(57) ABSTRACT

A liquid container configured to stimulate visual interest. In one embodiment, the container is a bottle configured to generate a liquid vortex within the bottle. In another embodiment, the bottle includes one or more light emitting diodes (LEDs) configured to illuminate the bottle and/or vortex. The bottle includes an agitator configured to generate the liquid vortex. The agitator generally includes a magnetic stir bar disposed within the bottle. The agitator further includes a stylized blade configured to cover the stir bar. The bottle is further configured to work with a mobile application. The app is configured to connect to the bottle via scanning a barcode and/or quick response (QR) code on the bottle. The app enables a user to modify the size and/or shape of the vortex, the speed of the rotor, and/or the light color and/or brightness of the LEDs.

24 Claims, 20 Drawing Sheets

VORTEX SPIRIT BOTTLE

CROSS REFERENCE TO RELATED APPLICATIONS

This application is a continuation-in-part of U.S. patent application Ser. No. 29/829,644, filed Mar. 7, 2022, which is hereby incorporated by reference.

BACKGROUND

In the food and beverage industry, various brands are constantly vying to gain the attention of potential consumers. Nightclubs, bars, restaurants, liquor stores, and the like usually have large stocks of liquor, wine, beer, and other beverage bottles on display such that various brands may be lost in the crowd. Even when consumers pick a particular brand, maintaining brand loyalty is always a concern.

Thus, there is a need for improvement in this field.

SUMMARY

A unique system for drawing attention to and developing brand loyalty in various products, such as for liquor bottles and other beverage containers, has been developed. The system visually attracts the attention of potential consumers by creating a vortex of liquid contained in a bottle and/or shines a single or multi-color light pattern into the liquid. This added visual interest can be helpful to draw attention in nightclubs and bars which usually have low or dramatic lighting environments. The system is also designed to be very portable and self-powered. The system further facilitates easy pouring of liquid from the bottle. In one version, the system includes a bottle with a stopper, a base coupled to the bottle, and a stirrer or agitator located inside the bottle that is activated by the base to create the vortex. To facilitate easy bottle replacement, the base is configured to indirectly rotate the stirrer in the bottle. To put it another way, the base is not directly connected to the stirrer in a mechanical sense so as to rotate the stirrer. In one form, the base and stirrer are in the form of a magnetic stirrer or magnetic mixer. The stirrer is designed to flex so as to fit through the narrow neck and mouth of the bottle during insertion into the bottle. The stirrer and base are designed to create the vortex even when the mouth of the bottle is closed by a stopper or cap.

The system is designed to give the bottle and base a unitary appearance. In other words, the base is integrated with the bottle such that the base appears to be part of the bottle. In one form, a shroud that wraps around the interface between the base and bottle is used to provide this illusion of a unitary appearance. The bottle and base are detachably coupled together so that the bottle can be replaced with a new one after the bottle is empty. The bottle is typically designed to be disposable and/or recyclable; while the base is designed not to be disposable and instead is repeatedly used. The bottle and base are detachably connected such that the bottle and base do not separate during routine use such as during pouring of the liquid. In one version, the bottle and base are connected through a threaded connection, and in another version, the bottle and base are connected through a snap-fit type connection. The base and bottle assembly is configured so as to be stable when stored on a shelf. The base is typically heavier than a full bottle so as to reduce the risk of tipping. At the same time, the weight of the base and bottle is balanced so as to not inhibit pouring even when the bottle is near empty.

At least part of the bottle is transparent or translucent (i.e., not opaque), and in one form, the bottle is made of transparent or translucent glass. The base has a light source configured to shine one or more lights through a bottom wall of the bottle and into the liquid such that the liquid in the bottle appears to glow. The light patterns and colors can vary depending on several factors. For instance, the light patterns, brightness, and/or colors can vary as the rotational speed of the stirrer changes and/or the level of the liquid changes. Depending on the color and/or type of liquid contained in the bottle, the lighting can vary. In clear liquids, such as gin or vodka, the base can shine more vibrant colors as compared to darker liquids like whiskey. The resulting lighting and vortex created together in the liquid can be quite stunning to a consumer.

The system is further designed to track usage patterns and brand loyalty. The based is configured to be wirelessly controlled by a mobile device such as a smart phone. For instance, via the mobile device, a user can change the vortex and/or lighting of the liquid in the bottle. The mobile device can be paired with a bottle by scanning a barcode or other machine-readable identifier on the bottle. Once paired, this information can be sent by the mobile device and/or base to a database that aggregates this information which can be used to track usage and other patterns. Based on the electrical current and/or voltage drawn by the base when rotating the stirrer, the volume of liquid in the bottle can be estimated. The level of the liquid in the bottle can also be estimated based on the properties of the light from the base reflected off the surface of the liquid in the bottle. These liquid volume estimates can be conveyed to the database for automatically replenishing product when inventory becomes low.

Again, in the food and beverage industry, visual stimulation and/or entertainment value is regarded highly when making food and/or beverage decisions. For example, many consumers will naturally gravitate towards a beverage that is styled in an entertaining and/or interesting way. As should be appreciated, generating visual interest with spirit bottles can be difficult. Typically, visual interest is stimulated based on the bottle shape and/or font. However, consumers can become easily bored and/or disinterested in bottles that sit on a shelf without visually stimulating and/or engaging characteristics.

This unique bottle system has been once more developed to stimulate visual interest. In one embodiment, the bottle is configured to generate a liquid vortex within the bottle to generate interest. In another embodiment, the bottle includes one or more light emitting diodes (LEDS) configured to illuminate the bottle and/or vortex. The bottle includes a vortex generator and/or agitator configured to generate the liquid vortex. The vortex generator generally includes a magnetic stirrer bar disposed within the bottle. In one example, the stirrer bar is packaged with the liquid. The vortex generator further includes a stylized blade configured to cover the stir bar. The stir bar and blade are both housed within the bottle and are configured to generate the liquid vortex. In other examples, the stir bar and the blade form a unitary vortex generator to increase visual appeal.

The bottle further includes a removable base portion. The base is generally threaded onto the bottle via one or more threads. As should be appreciated, the base is fully separate from the bottle such that the vortex generator and the base are separated by a bottom of the bottle. In one example, the base is designed to be imperceptible when mounted on the bottle. In another example, the base is covered by a stylized shroud configured to conceal the base. The base is configured to hold one or more visual enhancement components. In one example, the visual enhancement components include the one or more light emitting diodes (LEDS). In another example, the visual enhancement components include a power source configured to power the vortex. In one embodiment, the power source is a rotor configured to generate a rotating magnetic field. As should be appreciated, the rotating magnetic field interacts with the magnetic field of the stir bar described previously to induce rotation of the vortex generator. Put differently, the vortex generator and the power source are not mechanically connected.

In one example, the rotor is powered via one or more batteries. For example, the rotor is powered by one or more rechargeable batteries. The rechargeable batteries are configured to work with a wireless charging pad to enable wireless charging. In another example, the rotor is powered via a directly connected alternating current (AC) and/or direct current (DC) power source. The rotor includes one or more speed settings configured to adjust a rotational speed of the motor. As should be appreciated, adjusting the rotational speed of the rotor modifies the size and/or shape of the vortex via the vortex generator.

The bottle is further configured to work with a mobile application (app). The app is configured to connect to the bottle via scanning a barcode and/or quick response (QR) code on the bottle. In one example, the app connects to the bottle via Bluetooth low energy (BLE). The app enables a user to modify the size and/or shape of the vortex, the speed of the rotor, and/or the light color and/or brightness of the LEDS. In another example, the app shows the remaining battery life of the base.

The system and techniques as described and illustrated herein concern a number of unique and inventive aspects. Some, but by no means all, of these unique aspects are summarized below.

Aspect 1 generally concerns a system.

Aspect 2 generally concerns the system of any previous aspect further including a bottle.

Aspect 3 generally concerns the system of any previous aspect in which the bottle configured to contain a liquid.

Aspect 4 generally concerns the system of any previous aspect further including base.

Aspect 5 generally concerns the system of any previous aspect in which the base coupled to the bottle.

Aspect 6 generally concerns the system of any previous aspect in which the base is configured to generate a vortex in the liquid in the bottle.

Aspect 7 generally concerns the system of any previous aspect in which the base has an illumination device configured to illuminate the liquid in the bottle.

Aspect 8 generally concerns the system of any previous aspect in which the illumination device is positioned to shine light through an underside of the bottle.

Aspect 9 generally concerns the system of any previous aspect in which the illumination device includes one or more light emitting diodes (LEDs).

Aspect 10 generally concerns the system of any previous aspect further including a base upon which the bottle is supported.

Aspect 11 generally concerns the system of any previous aspect in which the base is configured to indirectly form the vortex without a direct mechanical connection to an interior of the bottle.

Aspect 12 generally concerns the system of any previous aspect in which the base includes a rotor configured to generate a rotating magnetic field to rotate a magnetic stirrer in the bottle.

Aspect 13 generally concerns the system of any previous aspect in which the base includes one or more batteries configured to power the rotor.

Aspect 14 generally concerns the system of any previous aspect in which the batteries include rechargeable batteries configured to charge via wireless charging.

Aspect 15 generally concerns the system of any previous aspect in which the rotor is configured to operate at variable speeds to modify the size and/or shape of the vortex.

Aspect 16 generally concerns the system of any previous aspect in which the base is detachably connected to the bottle via a threaded connection.

Aspect 17 generally concerns the system of any previous aspect in which the base includes a shroud in which an end of the bottle is received to give the bottle and the base a unitary appearance.

Aspect 18 generally concerns the system of any previous aspect in which the base includes a light source configured to illuminate the vortex.

Aspect 19 generally concerns the system of any previous aspect in which the light source includes one or more light emitting diodes (LEDs) configured to generate multiple colors.

Aspect 20 generally concerns the system of any previous aspect in which the base includes a wireless personal area network (WPAN) transceiver configured to communicate with a mobile device.

Aspect 21 generally concerns the system of any previous aspect in which the WPAN transceiver includes a Bluetooth® low energy (BLE) type transceiver.

Aspect 22 generally concerns the system of any previous aspect further including a mobile device includes a sensor configured to scan a code on the bottle to pair the bottle with the base.

Aspect 23 generally concerns the system of any previous aspect in which the mobile device is configured wirelessly to control color, size, and/or shape of the vortex.

Aspect 24 generally concerns the system of any previous aspect further including an agitator or stirrer.

Aspect 25 generally concerns the system of any previous aspect in which the agitator disposed inside the bottle.

Aspect 26 generally concerns the system of any previous aspect in which the base is configured to rotate the agitator within the bottle.

Aspect 27 generally concerns the system of any previous aspect in which the base includes an electromagnetic stirrer.

Aspect 28 generally concerns the system of any previous aspect in which the agitator includes a magnet.

Aspect 29 generally concerns the system of any previous aspect in which the base is configured to magnetically couple to the magnet of the agitator.

Aspect 30 generally concerns the system of any previous aspect in which the agitator includes a platform, a blade, and a stem connecting the blade to the platform.

Aspect 31 generally concerns the system of any previous aspect in which the stem is configured to bend to fit the agitator into the bottle.

Aspect 32 generally concerns the system of any previous aspect in which the base is detachably connected to the bottle via a mechanical connection.

Aspect 33 generally concerns the system of any previous aspect further including a shroud.

Aspect 34 generally concerns the system of any previous aspect in which the shroud covers the mechanical connection to hide the mechanical connection between the base and the bottle.

Aspect 35 generally concerns the system of any previous aspect further including a network.

Aspect 36 generally concerns the system of any previous aspect further including a mobile device.

Aspect 37 generally concerns the system of any previous aspect in which the mobile device operatively communicates with the base via the network.

Aspect 38 generally concerns the system of any previous aspect in which the mobile device is configured to control operation of the base.

Aspect 39 generally concerns the system of any previous aspect in which the mobile device is configured to control the vortex.

Aspect 40 generally concerns the system of any previous aspect in which the mobile device is configured to control size and/or shape of the vortex.

Aspect 41 generally concerns the system of any previous aspect in which the mobile device is configured to control the illumination device.

Aspect 42 generally concerns the system of any previous aspect in which the mobile device is configured to control color of light emitted by the illumination device.

Aspect 43 generally concerns the system of any previous aspect in which the mobile device is configured to control brightness of light emitted by the illumination device.

Aspect 44 generally concerns the system of any previous aspect in which the network includes a wireless personal area network (WPAN).

Aspect 45 generally concerns the system of any previous aspect in which the mobile device configured to pair the bottle with the mobile device.

Aspect 46 generally concerns the system of any previous aspect in which the mobile device is configured to pair the base with the mobile device.

Aspect 47 generally concerns the system of any previous aspect in which the mobile device is configured to pair the bottle with the base.

Aspect 48 generally concerns the system of any previous aspect in which the bottle has a machine-readable identifier.

Aspect 49 generally concerns the system of any previous aspect in which the mobile device is configured to read the machine-readable identifier on the bottle.

Aspect 50 generally concerns the system of any previous aspect in which the base has a machine-readable identifier.

Aspect 51 generally concerns the system of any previous aspect in which the mobile device is configured to read the machine-readable identifier on the base.

Aspect 52 generally concerns the system of any previous aspect in which the bottle is configured to stimulate visual interest.

Aspect 53 generally concerns the system of any previous aspect in which the bottle includes a vortex generator configured to generate a vortex of liquid contained in the bottle.

Aspect 54 generally concerns the system of any previous aspect in which the vortex generator includes a magnetic stirrer located in the bottle to generate the vortex.

Aspect 55 generally concerns the system of any previous aspect in which the vortex generator includes a blade mounted to the stir bar configured to generate the vortex.

Aspect 56 generally concerns the system of any previous aspect in which the blade has a stylized appearance configured to stimulate visual interest.

Aspect 57 generally concerns the system of any previous aspect in which the liquid in the bottle includes alcohol.

Aspect 58 generally concerns the system of any previous aspect in which the bottle and/or the base has a machine-readable identifier.

Aspect 59 generally concerns the system of any previous aspect in which the mobile device has a sensor to read the machines readable identifier to pair with the bottle and/or the base.

Aspect 60 generally concerns a method of operating the system of any previous aspect.

Aspect 61 generally concerns the method of any previous aspect further including generating a vortex within a liquid held within a bottle.

Aspect 62 generally concerns the method of any previous aspect in which the generating the vortex includes generating the vortex with a base.

Aspect 63 generally concerns the method of any previous aspect further including changing the vortex within the bottle via a mobile device.

Aspect 64 generally concerns the method of any previous aspect further including controlling one or more settings of the base via the mobile device.

Aspect 65 generally concerns the method of any previous aspect further including generating the vortex includes magnetically spinning an agitator with the bottle via the base.

Aspect 66 generally concerns the method of any previous aspect further including illuminating the liquid in the bottle with an illumination device in the base.

Aspect 67 generally concerns the method of any previous aspect further including adjusting illumination of the liquid in the bottle via the mobile device.

Aspect 68 generally concerns the method of any previous aspect further including reading an identifier of a bottle with a mobile device.

Aspect 69 generally concerns the method of any previous aspect further including pairing the bottle to the mobile device.

Aspect 70 generally concerns the method of any previous aspect further including reading an identifier of a base with a mobile device.

Aspect 71 generally concerns the method of any previous aspect further including pairing the base to the mobile device.

Aspect 72 generally concerns the method of any previous aspect further including sending data about the bottle from the mobile device to a server.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
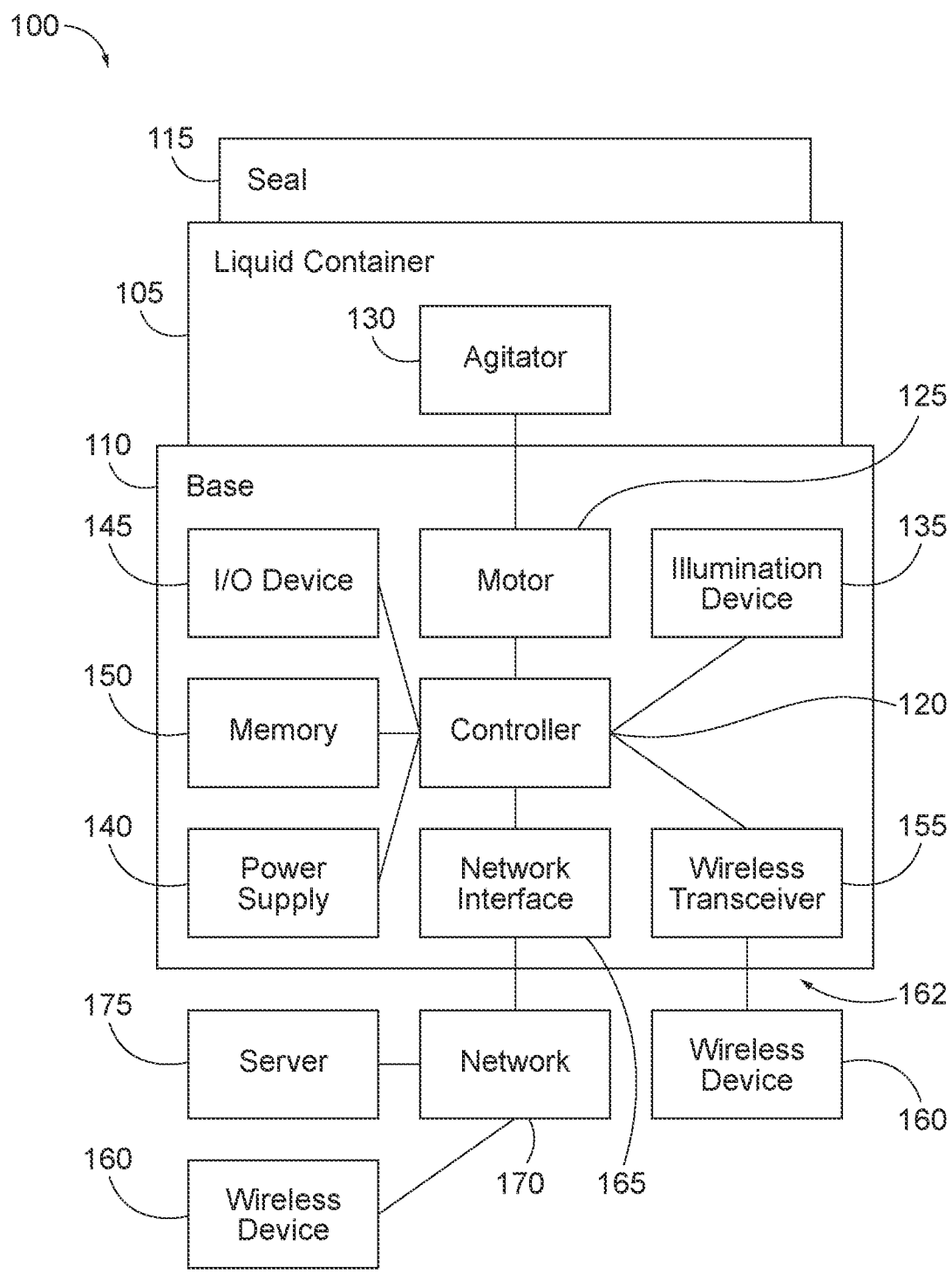
FIG. 1 is a diagrammatic view of a vortex generation system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows an example of a vortex generation system 100 configured to generate visual interest in consumers. The vortex generation system 100 includes a container 105 configured to hold liquid. In one example, the container 105 is in the form of a bottle. The container 105 is configured to hold liquid, such as water, alcohol, and/or other liquids. The container 105 is configured to display a vortex and/or whirlpool effect within the liquid of the container 105. As should be appreciated, the vortex is configured to generate visual interest in the container 105. The container 105 generally includes a removable base 110 configured to operate and/or generate the vortex. In some examples, the container 105 includes a seal 115 and/or stopper configured to seal the container 105 to prevent spillage and/or leakage of liquid from the container 105. Additionally, the seal 115 is configured to create an optimal pressure within the container 105 generate a vortex. In other examples, the container 105 does not include the seal 115, thus the container 105 is open to the atmosphere. In another example, the container 105 includes an aerator configured to enable the controlled release of gas instead of the seal 115.

The base 110 includes a controller 120 configured to control components of the base 110. For example, the controller 120 is configured to control a motor 125. In one example, the motor 125 is an electric motor configured to rotate one or more magnets in order to generate a variable magnetic field. Magnetically connected to the motor 125 is an agitator 130 and/or vortex generator. The agitator 130 is housed within the container 105 and is configured to rotate and/or spin in order to generate a vortex within the container 105. As should be appreciated, the motor 125 and the agitator 130 are separated by a bottom of the container 105 such that the motor 125 and agitator 130 are not mechanically connected. The base 110 further includes one or more illumination devices 135 configured to illuminate the container 105 to enhance visual interest. In one example, the illumination devices 135 include one or more light emitting diodes (LEDS). In another example, the illumination devices 135 includes other illumination devices.

The base 110 is powered via a power supply 140. In one example, the power supply 140 is in the form of one or more batteries. In another example, the power supply 140 is a hardwired and/or direct connection into the base 110 via an alternating current (AC) and/or direct current (DC) power source. In yet another example, the batteries are rechargeable batteries charged via inductive charging. For example, the vortex generation system 100 and/or base 110 are configured to rest on a wireless charging pad for extended use cases.

In one embodiment, the base 110 includes at least one input/output device (I/O device) 145. In some examples, the I/O device 145 includes speakers, microphones, lights, buttons, and/or other devices. The base 110 further includes a memory 150 configured to store information. In one example, the memory 150 stores information related to liquid remaining in the container 105, battery life of the base 110, a unique identifier for the vortex generation system 100, past order dates for the container 105 and/or stock keeping unit (SKU), and/or other information. The base 110 includes a wireless transceiver 155 configured to communicate with a wireless or mobile device 160. The wireless transceiver 155 and mobile device 160 form a wireless personal area network (WPAN) 162. In one example, the wireless transceiver 155 establishes communication between the base 110 and a mobile application (App) on a mobile device. In another example, the base 110 includes a network interface 165 configured to exchange information with a network 170. In one example, the network 170 is connected to a server 175. In one embodiment, the base 110 transfers data via the network interface 165 to the network 170. Data is then transferred from the network 170 and to the server 175 for storage.

Figure 2:
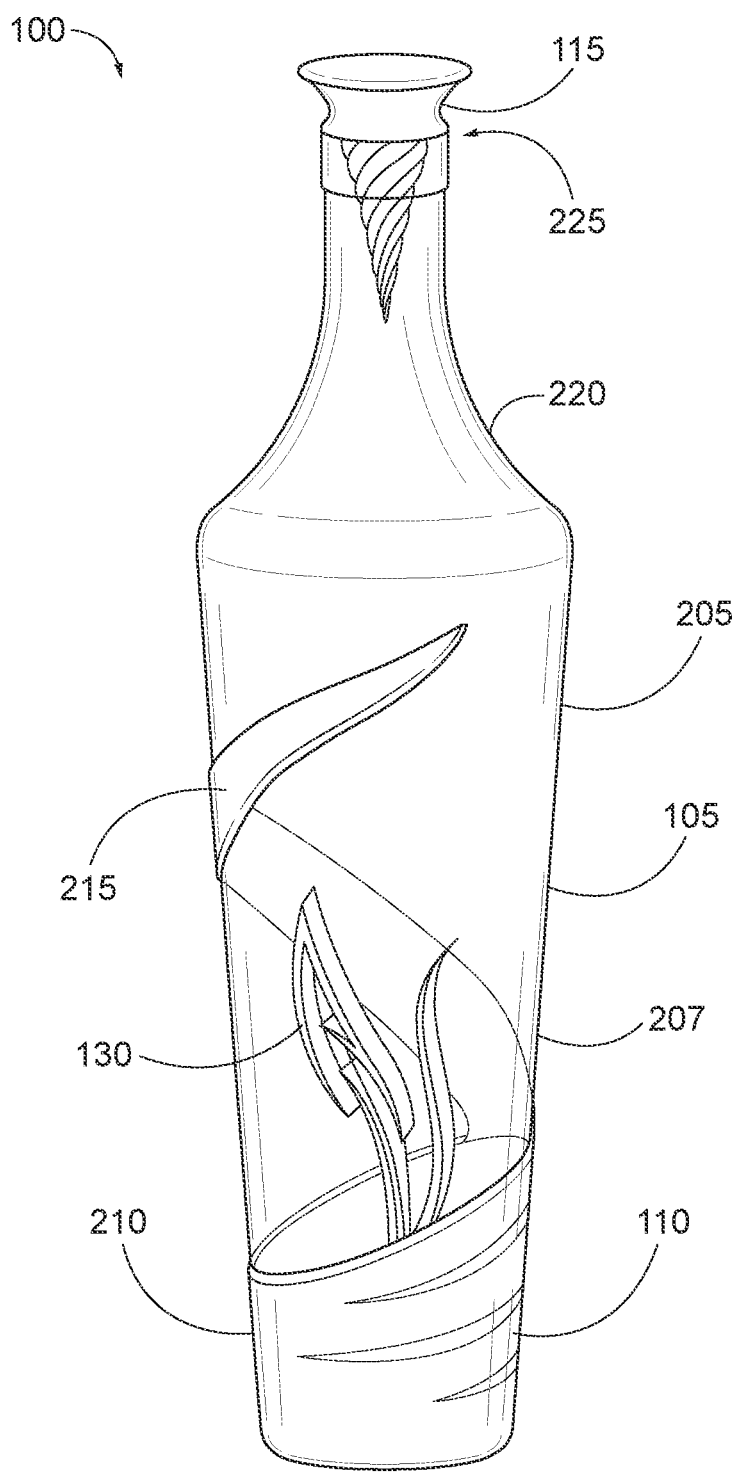
FIG. 2 is a perspective view of the vortex generation system of FIG. 1.

FIG. 2 shows an example of the vortex generation system 100. The container 105 of FIG. 2 is in the form of a bottle 205. The bottle 205 includes a body 207 extending into a neck 220. As should be appreciated, different styles and/or shapes of the body 207 may be used to enhance visual interest. In other examples, the bottle 205 may be made from an opaque, translucent, and/or transparent material depending on the contents of the bottle 205. The neck 220 defines a mouth 225 configured to enable a user to empty and/or fill the bottle 205 with liquid. In one example, the bottle 205 is filled with spirits and/or alcohol. For example, the bottle 205 is filled with beer, wine, gin, vodka, rum, whiskey, tequila, brandy, liqueur, and/or other alcohols. In yet another example, the bottle 205 is filled with other liquids, such as soft drinks and/or water.

The seal 115 is configured to plug the mouth 225 to prevent spillage and/or unwanted escape of gas from the bottle 205. As should be appreciated, unwanted gas release can lead to "flat" and/or unappetizing beverages. In one embodiment the bottle 205 includes one or more decorations configured to stimulate visual interest. For example, the bottle 205 includes a shroud 210. The shroud 210 is configured to provide a stylized and/or visually interesting cover to portions of the body 207. In some embodiments, the shroud 210 extends into a wrap 215 configured enhance the appearance of the bottle 205.

Figure 3:
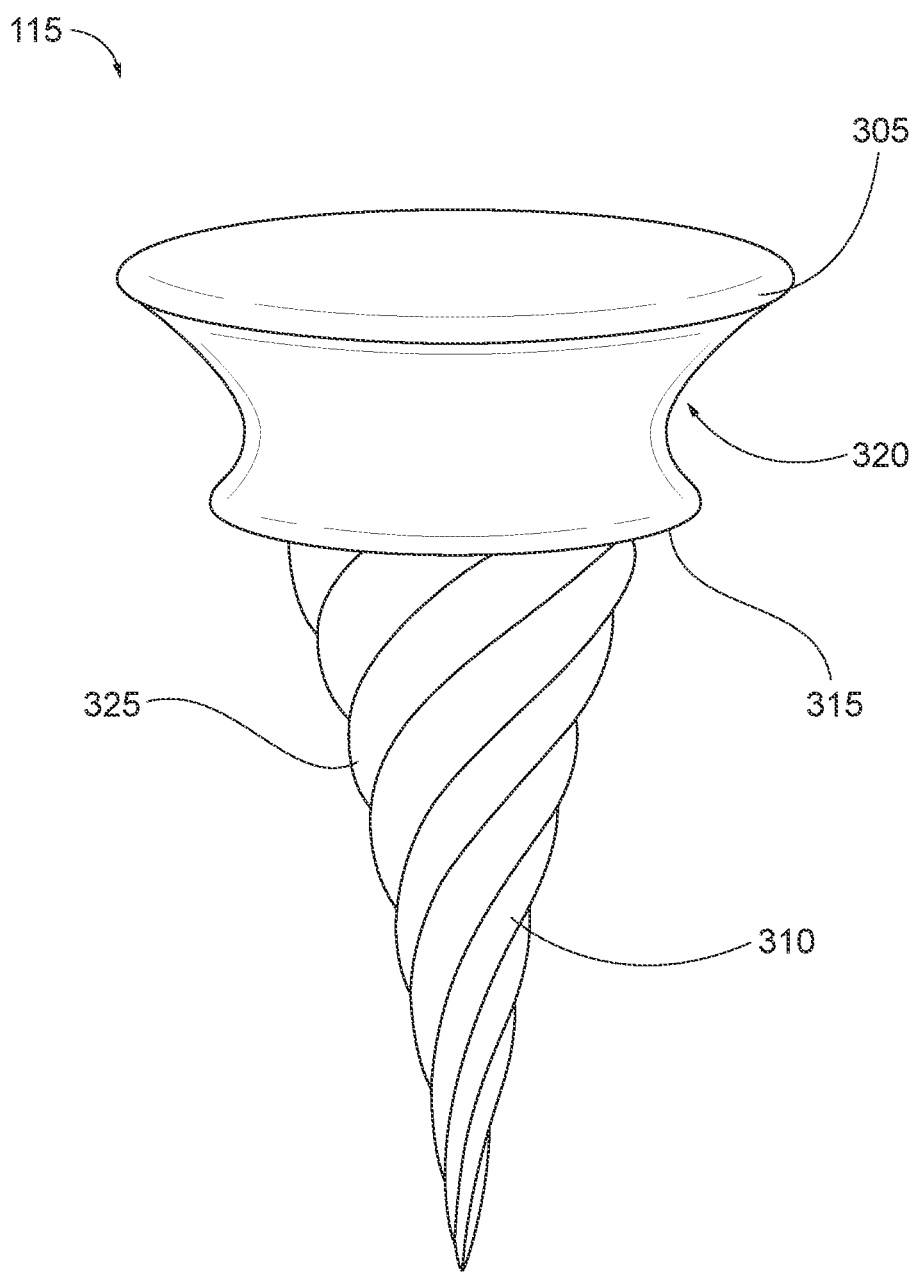
FIG. 3 is a perspective view of a seal of the vortex generation system of FIG. 1.

Turning to FIG. 3, the seal 115 is shown to include a head 305 and a corkscrew 310. The head 305 extends into a lip 315 configured to rest against the mouth 225 of the bottle 205. The lip 315 is further configured to prevent the seal 115 from falling into the bottle 205. Between the head 305 and the lip 315 is a groove 320. The groove 320 enables a user to grasp and/or grip the seal 115 to remove and/or insert the seal 115 from the mouth 225.

The head 305 is configured to protrude outward (away from the bottle 205) from the bottle 205, while the corkscrew 310 is configured to protrude into the bottle 205. The corkscrew 310 includes a spiral pattern 325 configured to plug the mouth 225 of the bottle 205 and prevent gas and/or liquid from escaping. As should be appreciated, the seal 115 may have various designs and or stylistic shapes depending on the use case.

Figure 4:
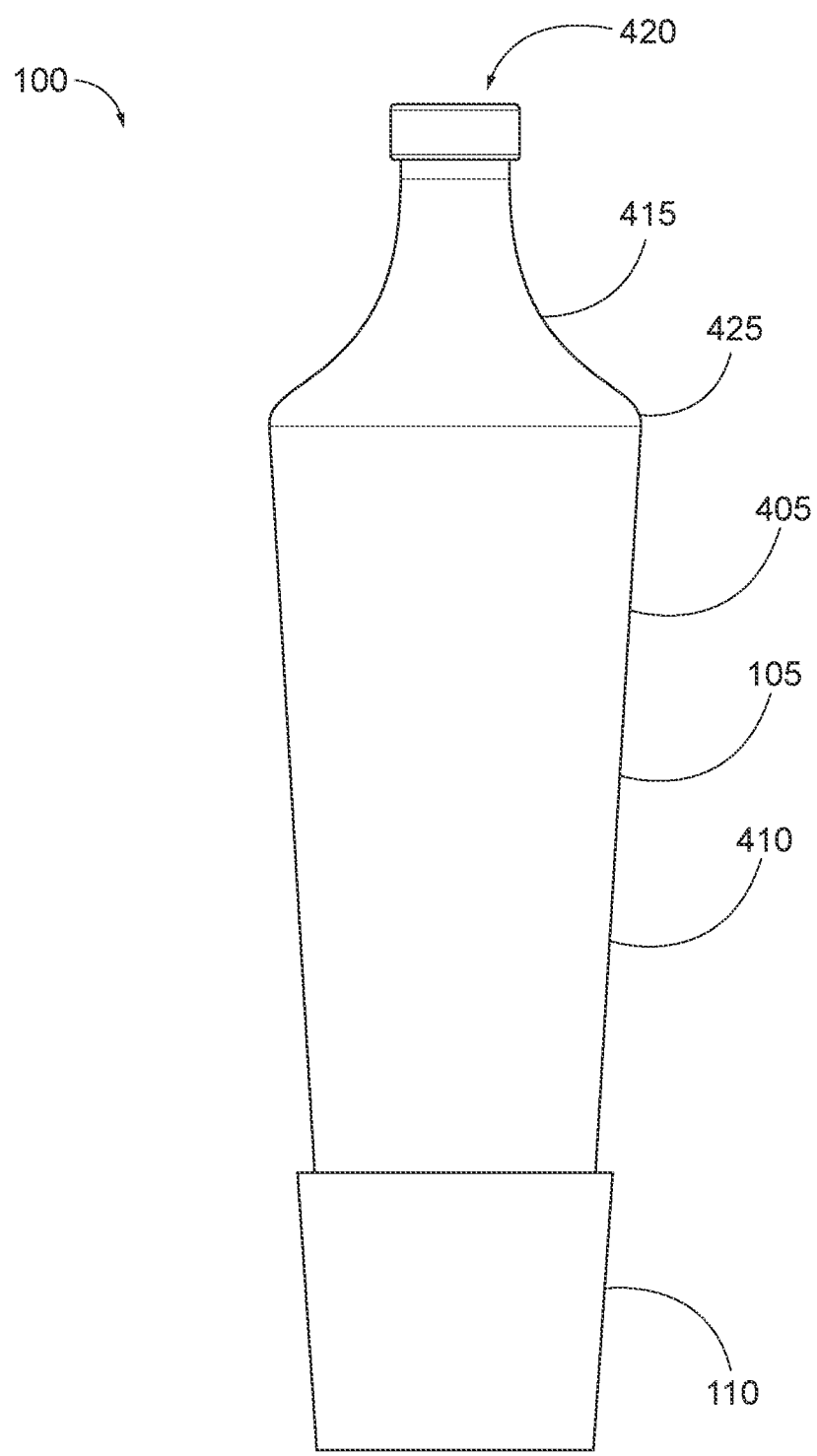
FIG. 4 is a side view of the vortex generation system of FIG. 1.

Another embodiment of the container 105 is shown in FIG. 4, the container 105 of FIG. 4 has a bottle 405 with different stylistic components and/or designs. The bottle 405 has a body 410 extending into a neck 415 defining a mouth 420. As should be appreciated, the bottle 405 provides a user with more options for personalizing visual components of the vortex generation system 100. The neck 415 is narrower than the body 410. Between the body 410 and the neck 415, the bottle 405 has a shoulder 425. The shoulder 425 forms a transition between the differently sized body 410 and neck 415.

Figure 5:
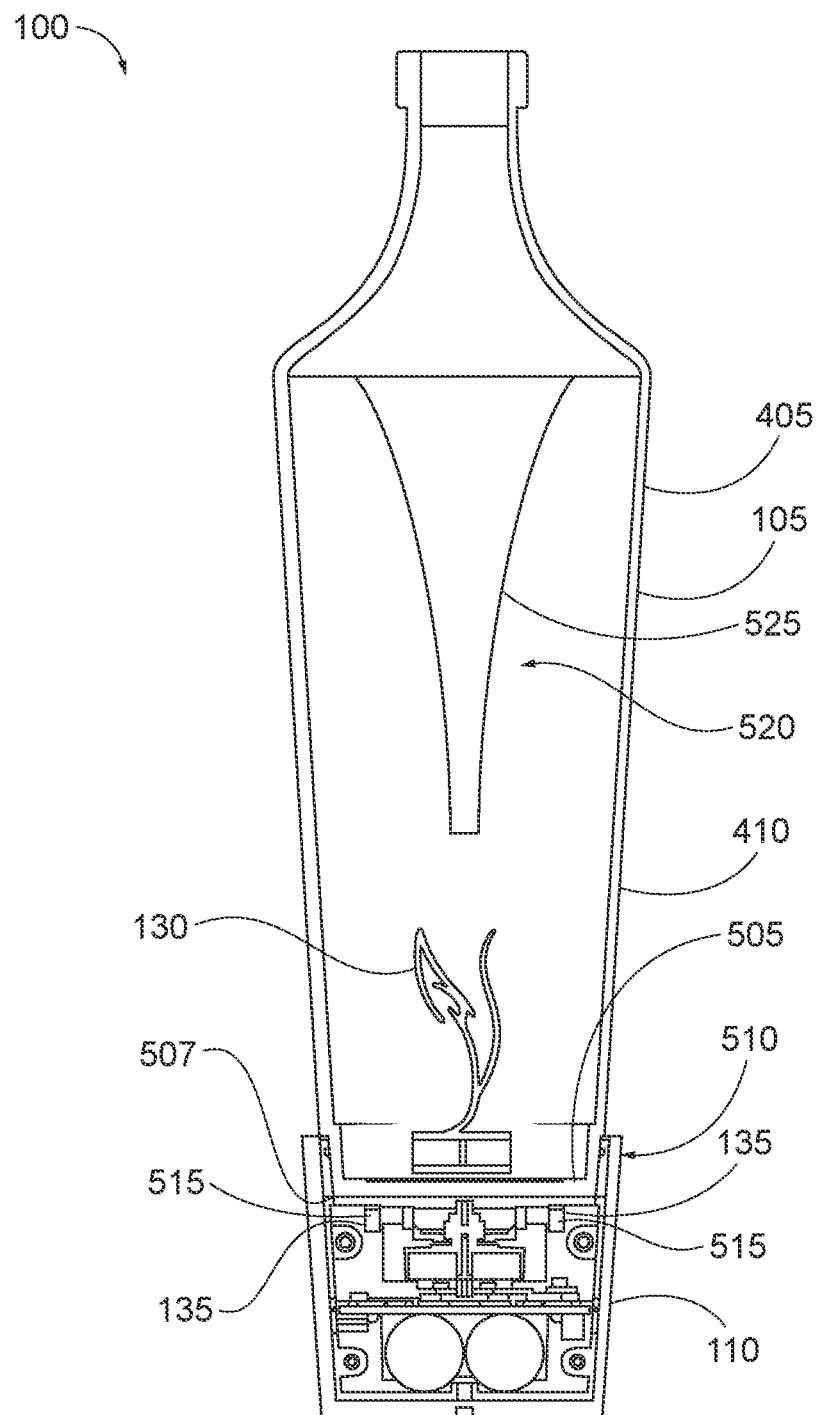
FIG. 5 is a cross-sectional view of the vortex generation system of FIG. 1

FIG. 5 shows another view of the container 105 including an underside 505 and/or bottom of the bottle 405. The bottle 405 has a heel 507 that forms a transition between the body 410 and the underside 505. As can be seen, the agitator 130 is configured to rest on the underside 505 such that the agitator 130 is mechanically separated from the motor 125 of the base 110. Put differently, the agitator 130 and the motor 125 are not in direct mechanical contact with each other. The base 110 is removably mounted to the container 105 via a threaded connection 510. As should be appreciated, the threaded connection 510 enables a user to install and/or remove the base 110 from the underside 505 as desired. Housed within the base 110 are the illumination devices 135. In one example, the illumination devices 135 are in the form of one or more light emitting diodes 515. As was mentioned previously, the light emitting diodes 515 are configured to illuminate the container 105 in order to stimulate visual interest.

As noted before, the container 105 is configured to contain a liquid 520, such as liquor or other beverages. When the base 110 rotates the agitator 130, a vortex 525 is formed in the liquid 520. Depending on the rotational speed of the agitator 130, the size and shape of the vortex 525 in the liquid 520 can change. The light emitting diode 515 can be further configured to receive light reflected off of the surface of the liquid 520 and vortex 525 so as to sense the level of liquid 520 remaining in the bottle 405.

At least the underside 505 is translucent or transparent so that the light from the illumination device 135 is able to shine through the bottle 405 and illuminate the liquid 520 and/or vortex 525. All or part of the body 410 of the bottle 405 is made of transparent or translucent material so that the vortex 525 in the liquid 520 and lighting from the illumination device 135 is visible to the consumer. In one form, the entire bottle 405 is made of transparent or translucent glass or plastic. In another form, only part of the bottle 405 is made of translucent or transparent material.

Figure 6:
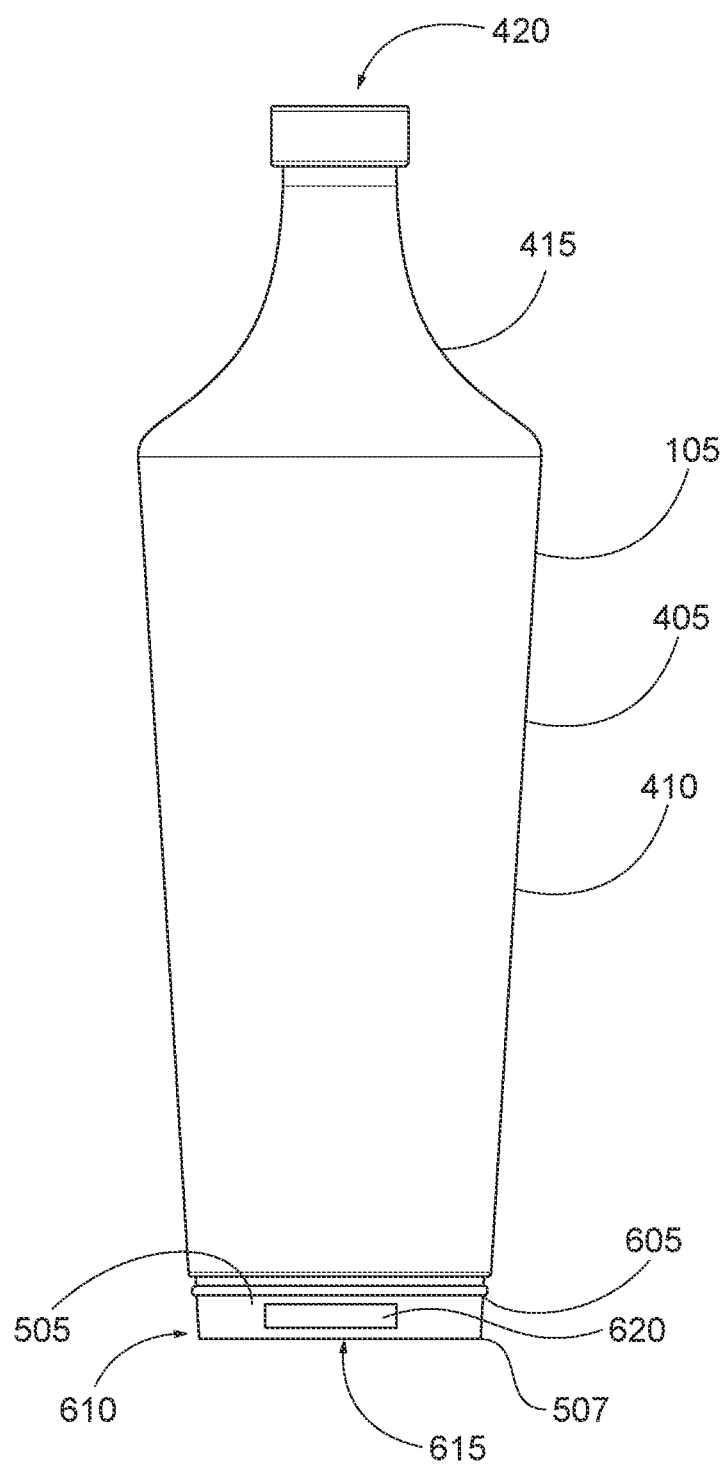
FIG. 6 is a side view of a container of the vortex generation system of FIG. 1.

Turning to FIG. 6, an example of the bottle 405 is shown. The bottle 405 further includes a shank 610 with one or more threads 605. As should be appreciated, the shank 610 and threads 605 are configured to interact with the base 110 in order to form the threaded connection 510.

In the illustrated example, the bottle 405 has a machine-readable identifier 615 located below the threads 605 and proximal the heel 507. In one form, the machine-readable identifier 615 is in the form of a barcode 620, but the machine-readable identifier 615 can take other forms such as in the form of an RFID tag. The machine-readable identifier 615 is read by the mobile device 160 so as to pair the bottle 405 with the base 110 as well as provide information to the server 175. With the machine-readable identifier 615 being located proximal the heel 507 or on the underside 505, the machine-readable identifier 615 is hidden from view when the bottle 405 is secured to the base 110.

Figure 7:
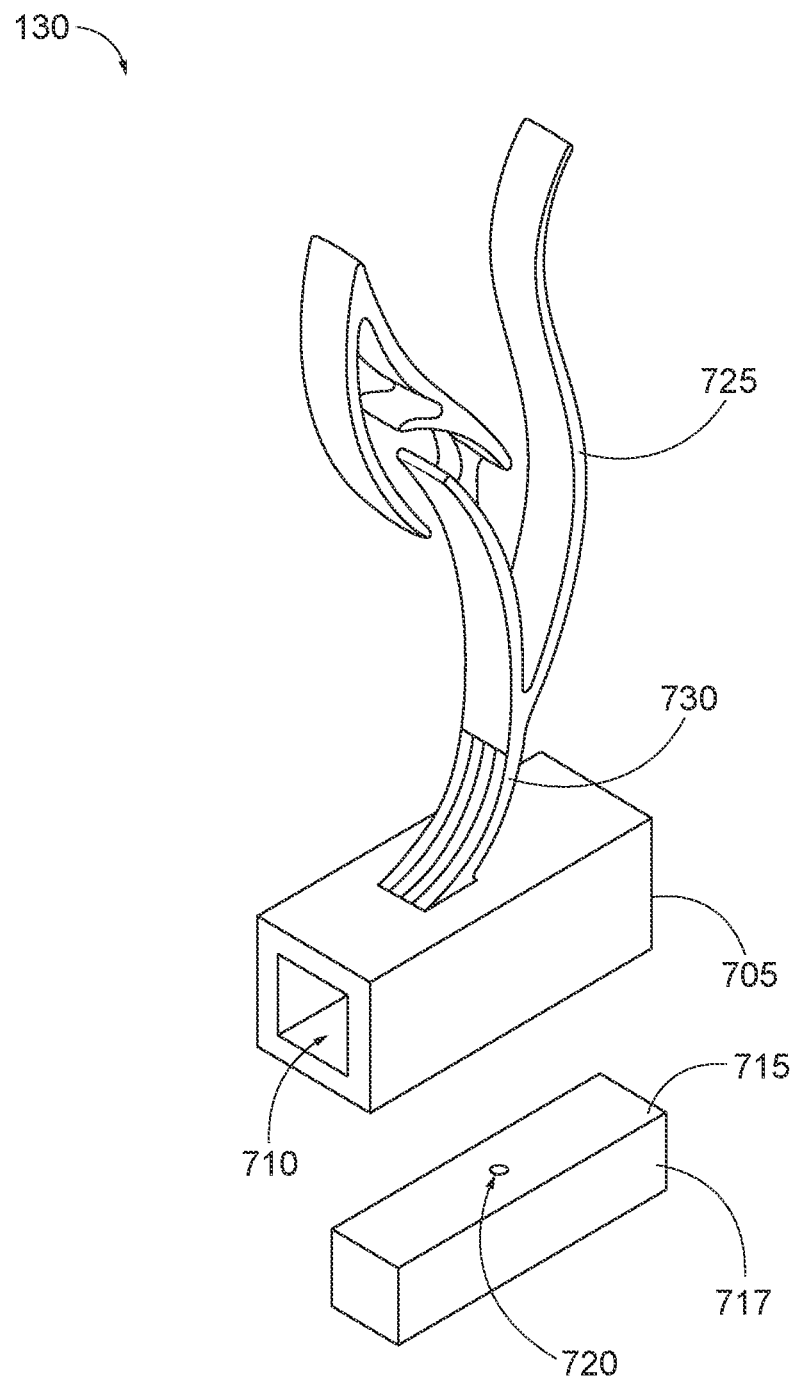
FIG. 7 is a perspective view of an agitator of the vortex generation system of FIG. 1.
Figure 8:
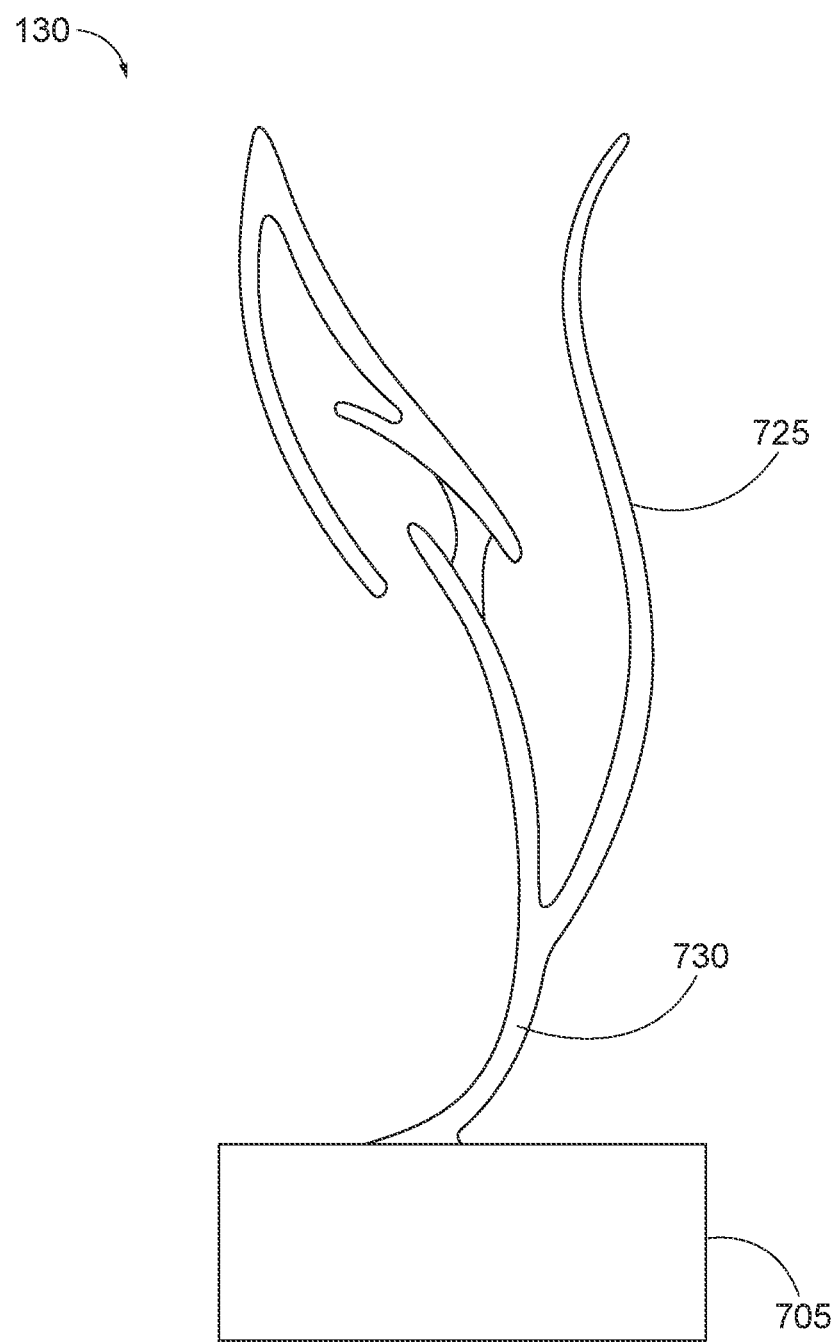
FIG. 8 is a side view of the agitator of FIG. 7.

FIGS. 7 and 8 show different views of the agitator 130. As can be seen, the agitator 130 includes a platform 705 defining a platform cavity 710. The platform 705 is configured to rest against the underside 505 and/or bottom of the container 105 separate from the base 110. The platform cavity 710 is configured to receive a stir bar 715. In one example, the stir bar 715 is magnetic. For example, the stir bar 715 is made from a magnet 717 such as a permanent magnet. In yet another example, the magnet 717 is surrounded by a human-safe cover to prevent contamination of the liquid within the container 105. The stir bar 715 is configured to magnetically interact with the motor 125 of the base 110 to generate the vortex and/or whirlpool effect. The stir bar 715 includes a detent 720 configured to retain the stir bar 715 within the platform cavity 710. The agitator 130 further includes a blade 725. The blade 725 is configured to generate drag within the liquid of the container 105 to create the vortex. As should be appreciated, a blade 725 with a larger surface area creates more drag and a greater vortex, which a blade 725 with less surface area creates less drag and a smaller vortex. In one example, the blade 725 is stylistic and designed to enhance visual stimulation of the vortex generation system 100.

The blade 725 is connected to the platform 705 via a stem 730. Again, the blade 725 is generally sized to be as large as possible, but the agitator 130 still has to be small enough to fit through the mouth 420 and neck 415 of the bottle 405. To accommodate this, the agitator 130 in one form is designed to be folded. The stem 730 is made of flexible material, such as a flexible metal and/or plastic material, so that the stem 730 is able to bend as the agitator 130 is inserted through the mouth 420 of the bottle 405. For instance, the stem 730 bends as the blade 725 is bent toward the platform cavity 710 so that the agitator 130 is able to be inserted into the bottle 405. In one form, the stem 730 is in the form of a spring.

Figure 9:
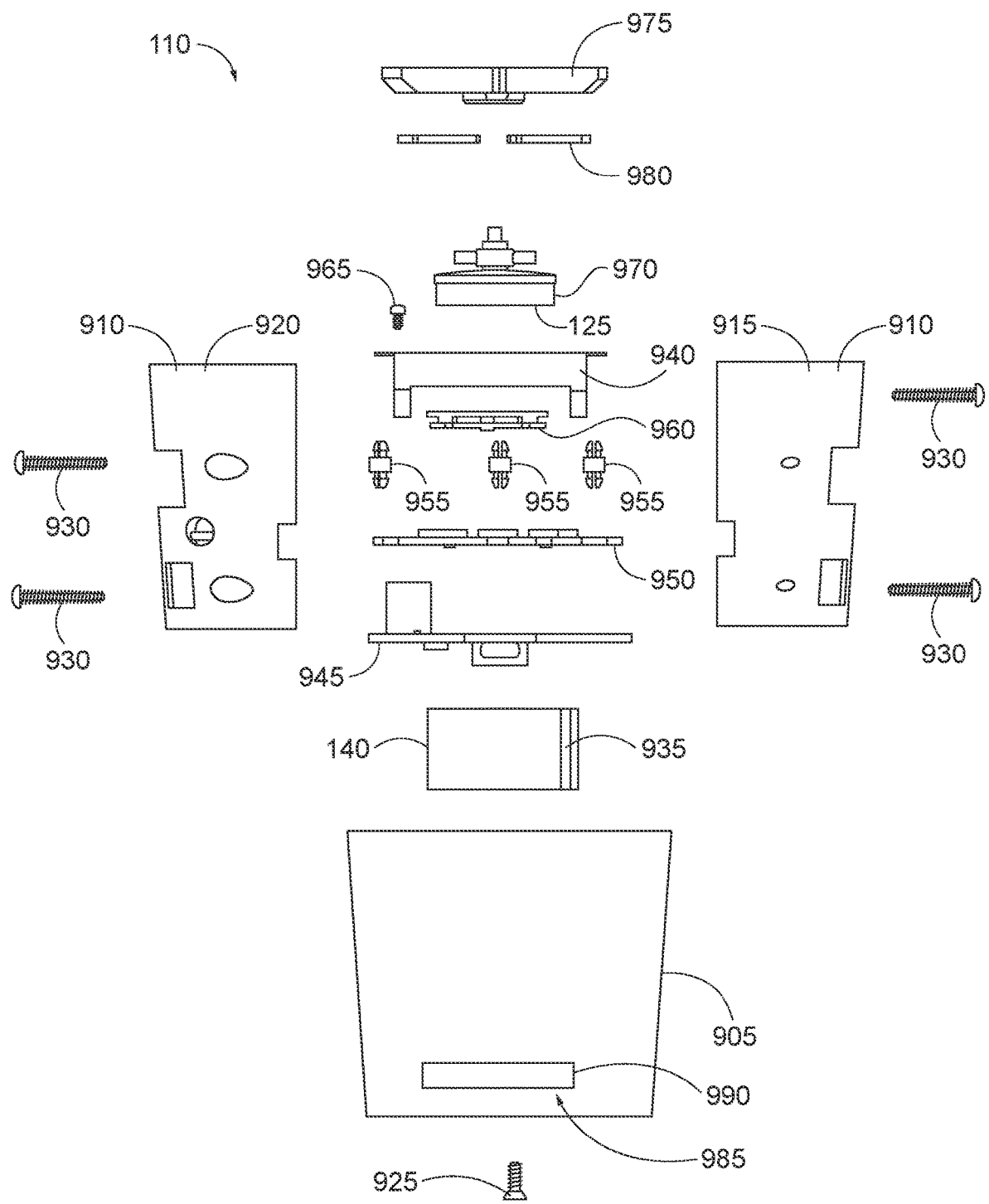
FIG. 9 is an exploded view of a base of the vortex generation system of FIG. 1.

FIG. 9 shows an exploded view of the base 110. The base 110 includes a shroud 905 configured to surround and cover a housing 910. The housing 910 has a first housing component 915 and a second housing component 920. The first housing component 915 and second housing component 920 are configured to combine to form the housing 910. The housing 910 is configured to mount within the shroud 905 via a fastener 925. The first housing component 915 and second housing component 920 are secured together via one or more fasteners 930. In one example, the shroud 905 is configured to surround the housing 910 to provide a uniform appearance and/or a visually appealing appearance.

Held within the housing 910 are one or more batteries 935. In one example, the batteries 935 are in the form of alkaline batteries, lithium ion batteries, carbon zinc batteries, silver oxide batteries, zinc air batteries, nickel cadmium batteries, nickel-metal hydride batteries, and/or other battery types. As should be appreciated, the batteries 935 may be rechargeable batteries and/or single use batteries. In one embodiment, the batteries 935 are configured to charge via a wireless charging pad. For example, the user sets the base 110 on the wireless charging pad to charge the batteries 935 while the vortex generation system 100 is on display. In other examples, the power supply 140 is instead an AC and/or DC power source. The batteries 935 are held by one or more battery terminals 940. In some examples, the batteries 935 are removable and/or replaceable within the battery terminals 940 by a user. The battery terminals 940 are mounted to a chassis 945 configured to retain a circuit board 950 via one or more clips 955.

Mounted on the chassis 945 via one or more fastener 965 is a motor mount 960. As should be appreciated, the motor mount 960 is configured to retain a motor 970. In one example, the motor 970 is an electric motor. In another example, the motor 970 is a permanent magnet synchronous motor. In yet another example, the motor 970 is an AC induction motor. The motor 970 receives power from the batteries 935 to generate rotation in a rotor 975. The rotor 975 includes one or more trays 1015 (shown in FIG. 10) configured to hold one or more magnets 980. In one example, the magnets 980 are permanent magnets. In another example, the magnets 980 are electromagnets. As should be appreciated, rotation of the magnets 980 generates a rotating magnetic field. The rotating magnetic field is configured to interact with the magnetic field of the stir bar 715 to generate rotation of the agitator 130. As has been described previously, rotation of the agitator 130 creates a vortex within the container 105. Due to the magnetic interaction between the magnets 980 and the stir bar 715, the agitator 130 is configured to rotate without a direct mechanical connection to the motor 970. As should be appreciated, this configuration prevents liquid from contacting any electrical components of the base 110, thus enhancing the lifespan of the base 110.

The base 110 further has a machine-readable identifier 985 that is used to identify the base 110. In the illustrated example, the machine-readable identifier 985 includes a barcode 990, but the machine-readable identifier 985 can include other types. The machine-readable identifier 985 can be used to pair the base 110 with the mobile device 160. By reading the machine-readable identifier 615 on the bottle 405 and the machine-readable identifier 985 on the base 110, the mobile device 160 is able to pair the bottle 405 with the base 110 along with the mobile device 160 which can be used by the server 175 for tracking and other purposes. In the depicted example, the machine-readable identifier 985 is located on the shroud 905, but the machine-readable identifier 985 can be located elsewhere on the base 110 such as on the bottom of the base 110 to enhance aesthetics.

Figure 10:
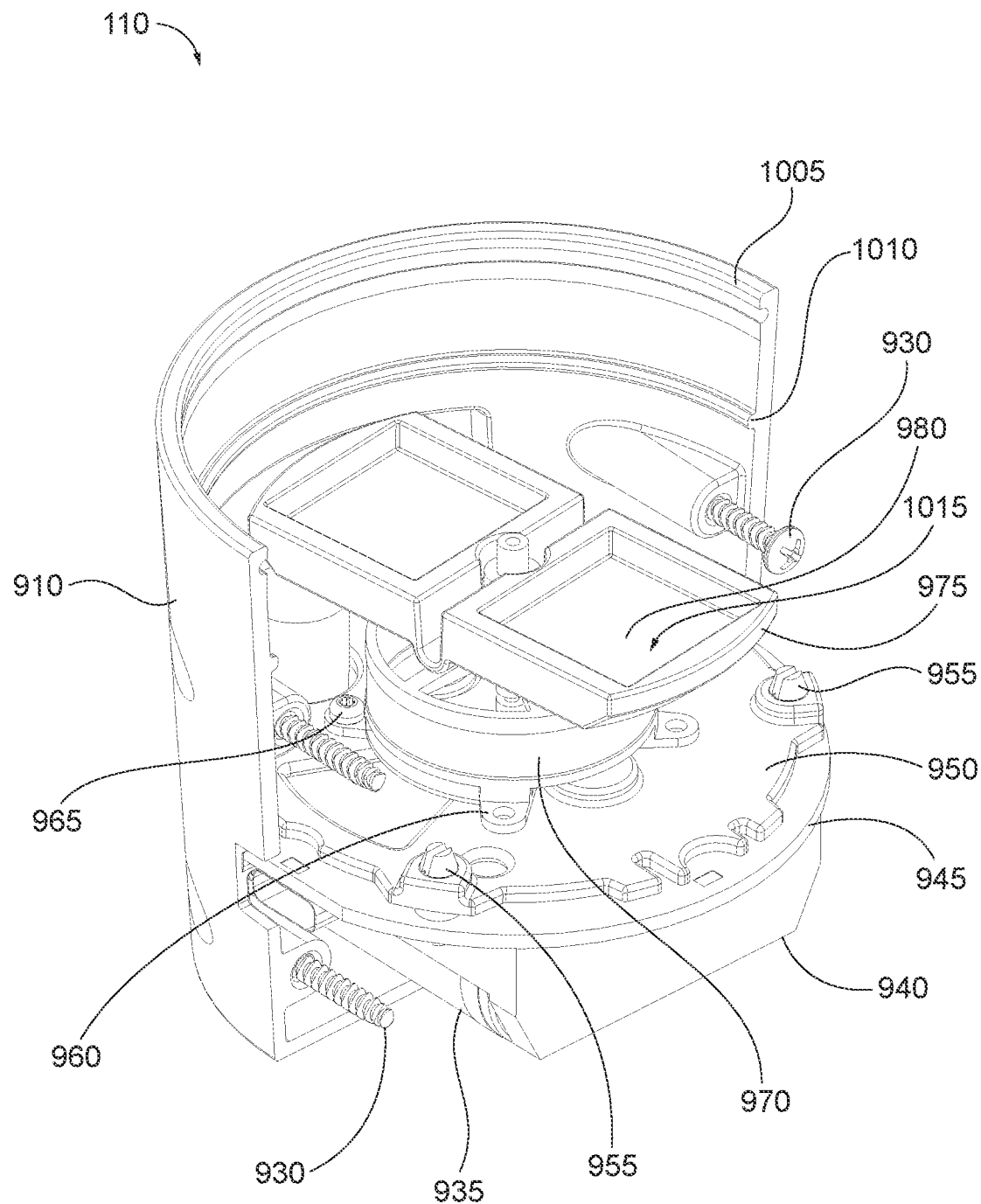
FIG. 10 is a perspective view of the base of the vortex generation system of FIG. 1.
Figure 11:
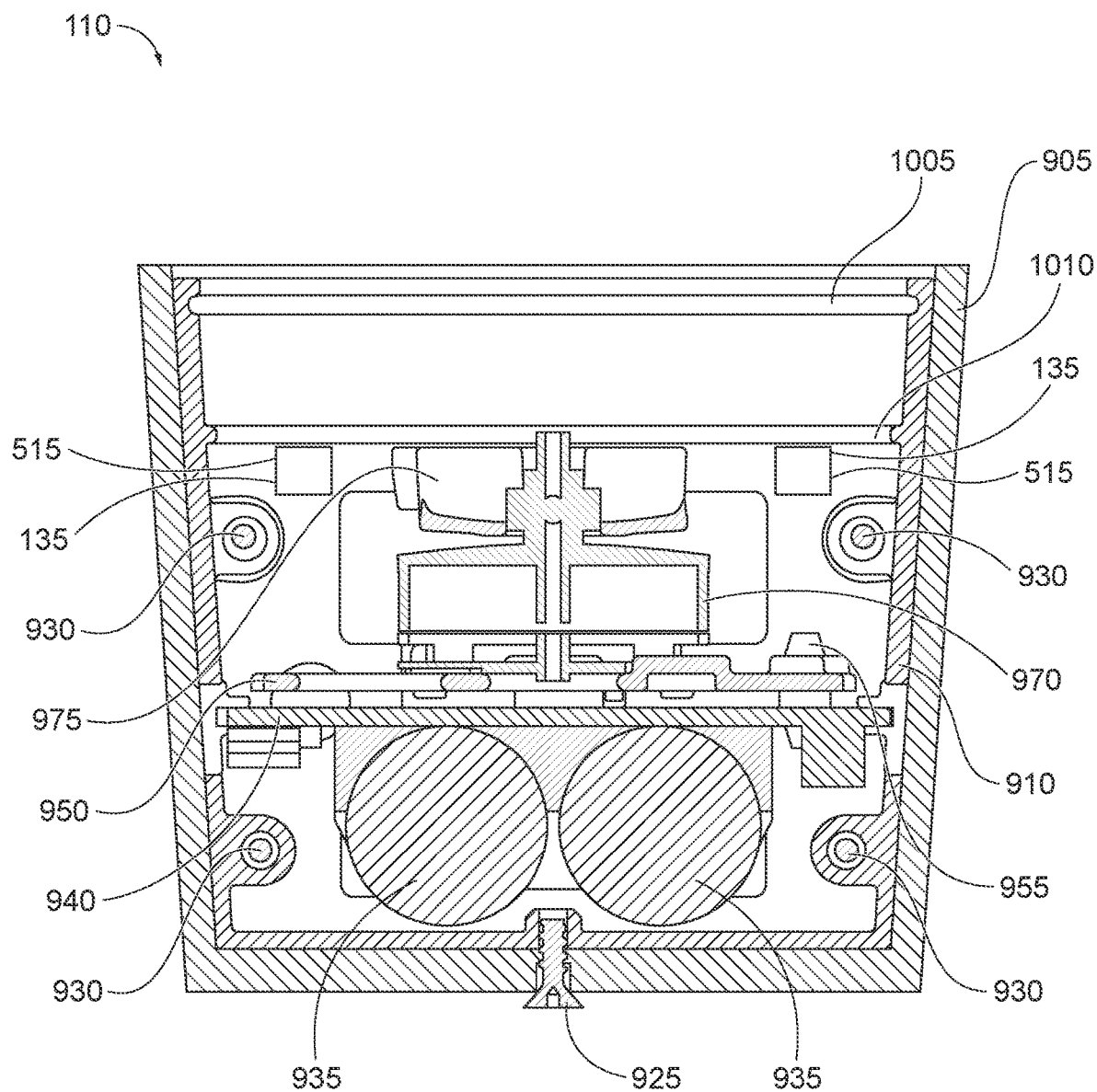
FIG. 11 is a cross-sectional view of the base of the vortex generation system of FIG. 1

As shown in FIGS. 10 and 11, the housing 910 includes one or more threads 1005 configured to interact with the threads 605 of the bottle 405 to form the threaded connection 510. In other embodiments, the base 110 is mounted to the container 105 in different ways, for example, via fasteners, adhesives, and/or other methods. In another embodiment, the base 110 is integral to the container 105 such that the container 105 and base 110 form a unitary component. The housing 910 further includes a ridge 1010 configured to abut the underside 505 and/or bottom of the container 105. In one example, the ridge 1010 is configured to abut the underside 505 when the threaded connection 510 is sufficiently tightened. This configuration prevents over tightening of the container 105 and the base 110. In yet another example, the ridge 1010 is configured to abut the underside 505 when a predetermined threshold distance between the magnets 980 and the stir bar 715 is met. As should be appreciated, this configuration enables consistent spacing for the magnets 980 and the stir bar 715 to ensure proper function of the agitator 130.

Figure 12:
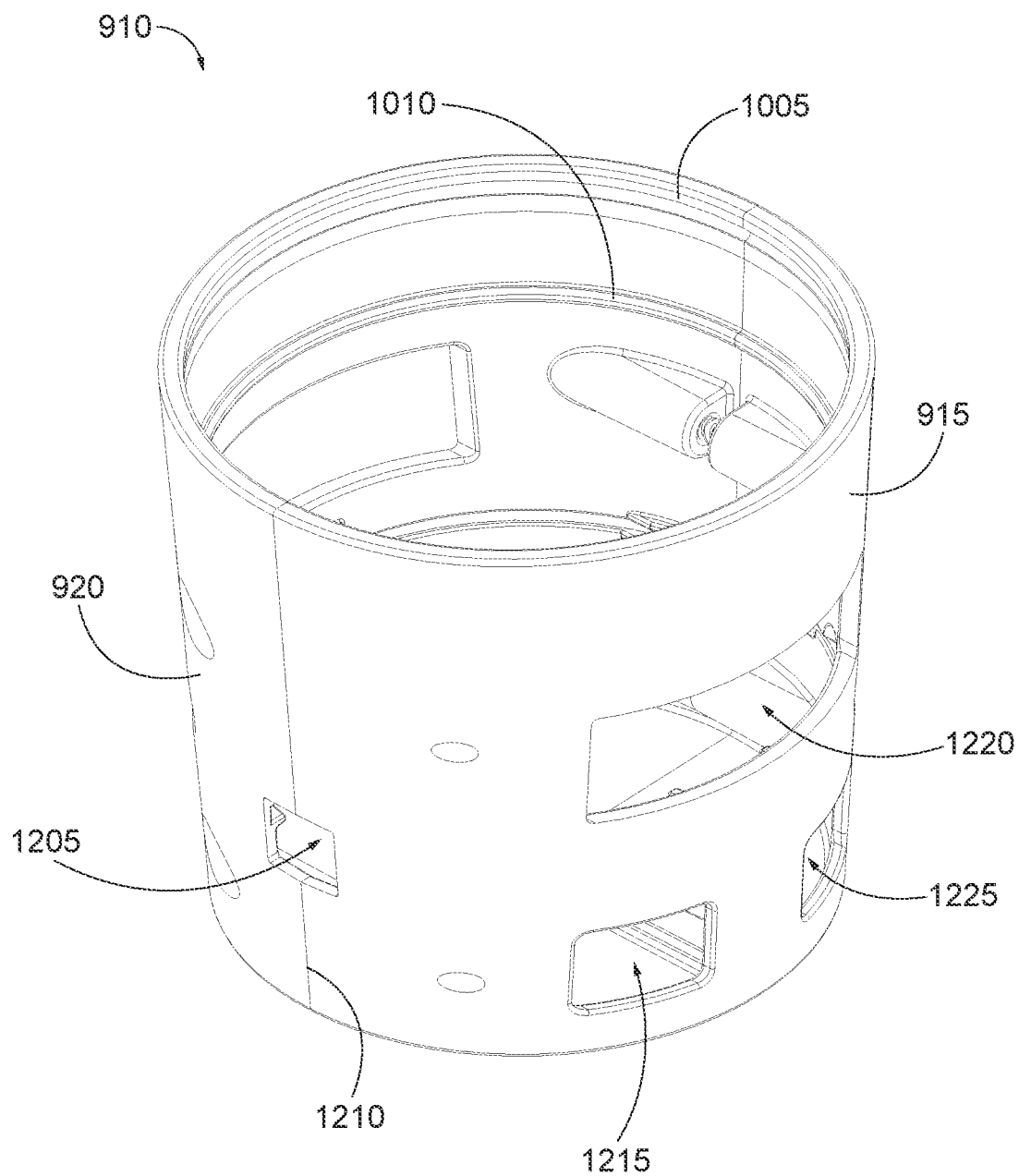
FIG. 12 is a perspective view of a housing of the base of FIG. 9.
Figure 13:
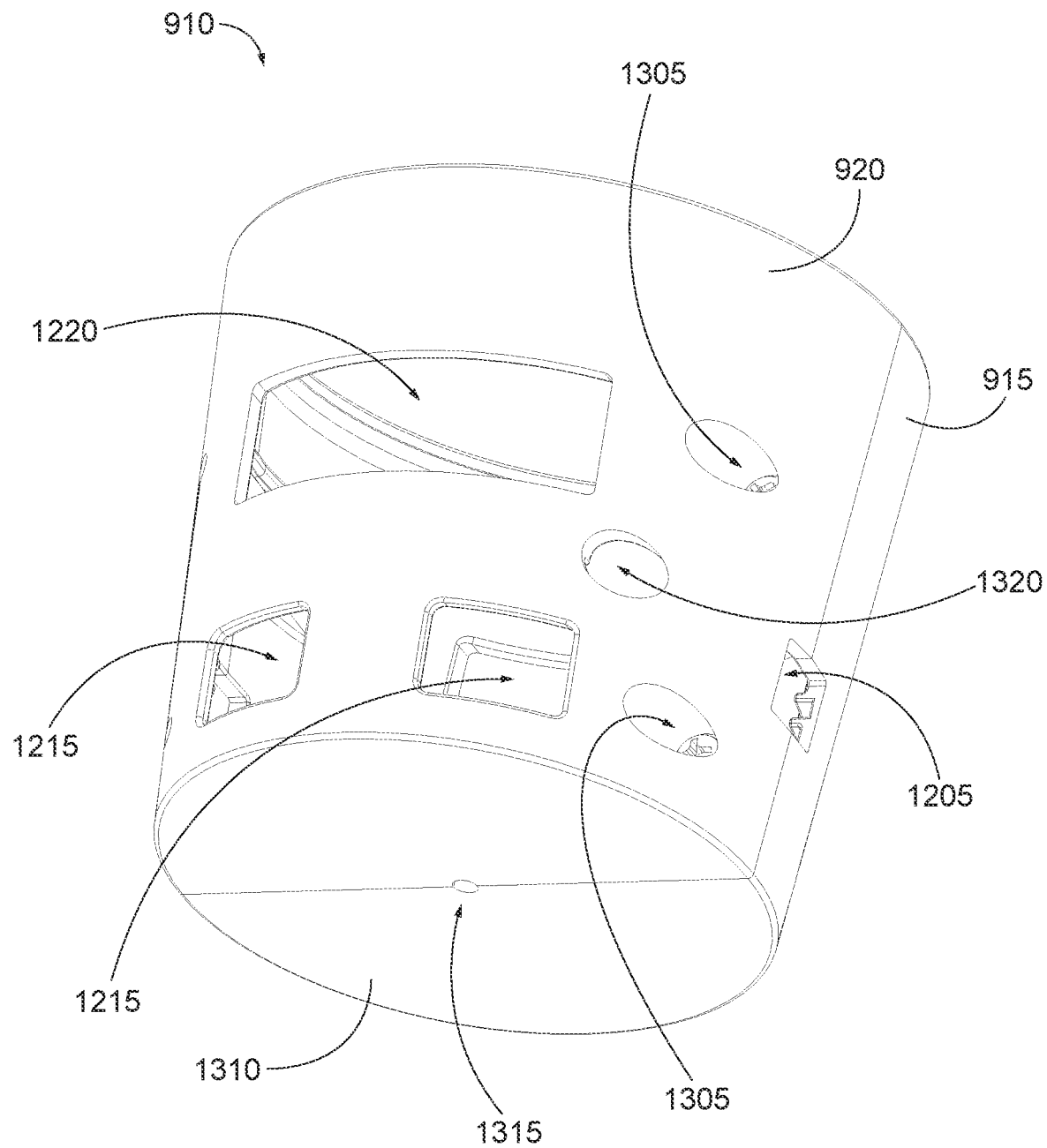
FIG. 13 is a bottom perspective view of the housing of FIG. 12.

FIGS. 12 and 13 show multiple views of the housing 910. The housing 910 is shown to include a port 1205 configured to receive a plug and/or connector. In one example, the port 1205 is a universal serial bus (USB) port configured to receive a USB plug. In one example, the USB port is used to download and/or upload data to and/or from the base 110. In another example, the port 1205 is another electronic port, such as a charging port, display port, ethernet port, digital video interface (DVI) port, video graphic array (VGA) port, and/or other type of port. The first housing component 915 from the second housing component 920 are separated via a seam 1210. In one example, the housing 910 further includes one or more apertures 1215 configured to enable connection and/or use of one or more accessories. In one example, the apertures 1215 enable a user to insert accessories such as USB ports, charging cables, and/or other accessories into the housing 910.

In some examples, the housing 910 further includes a channel 1220 configured to enable insertion and/or removal of components of the base 110 without separation of the housing 910. In another embodiment, the apertures 1215 and channel 1220 are configured to reduce the amount of material needed to manufacture the housing 910. In yet another embodiment, the apertures 1215 and the channel 1220 are configured to reduce the weight of the housing 910. The first housing component 915 and the second housing component 920 are held together via the fasteners 930 arranged through one or more holes 1305. Located in a bottom 1310 of the housing 910 is an aperture 1315 configured to receive the fastener 925. As mentioned previously, the fastener 925 secures the shroud 905 to the housing 910. In one example, the housing 910 has a window 1320 configured to hold a battery light (not shown). The battery light is configured to illuminate based on a charge value of the battery 935. For example, the window 1320 is configured to illuminate red when the charge remaining in the battery 935 is low and/or below 50 percent. In another example, the window 1320 is configured to illuminate green if the charge remaining in the battery 935 is full and/or over 50 percent.

Figure 14:
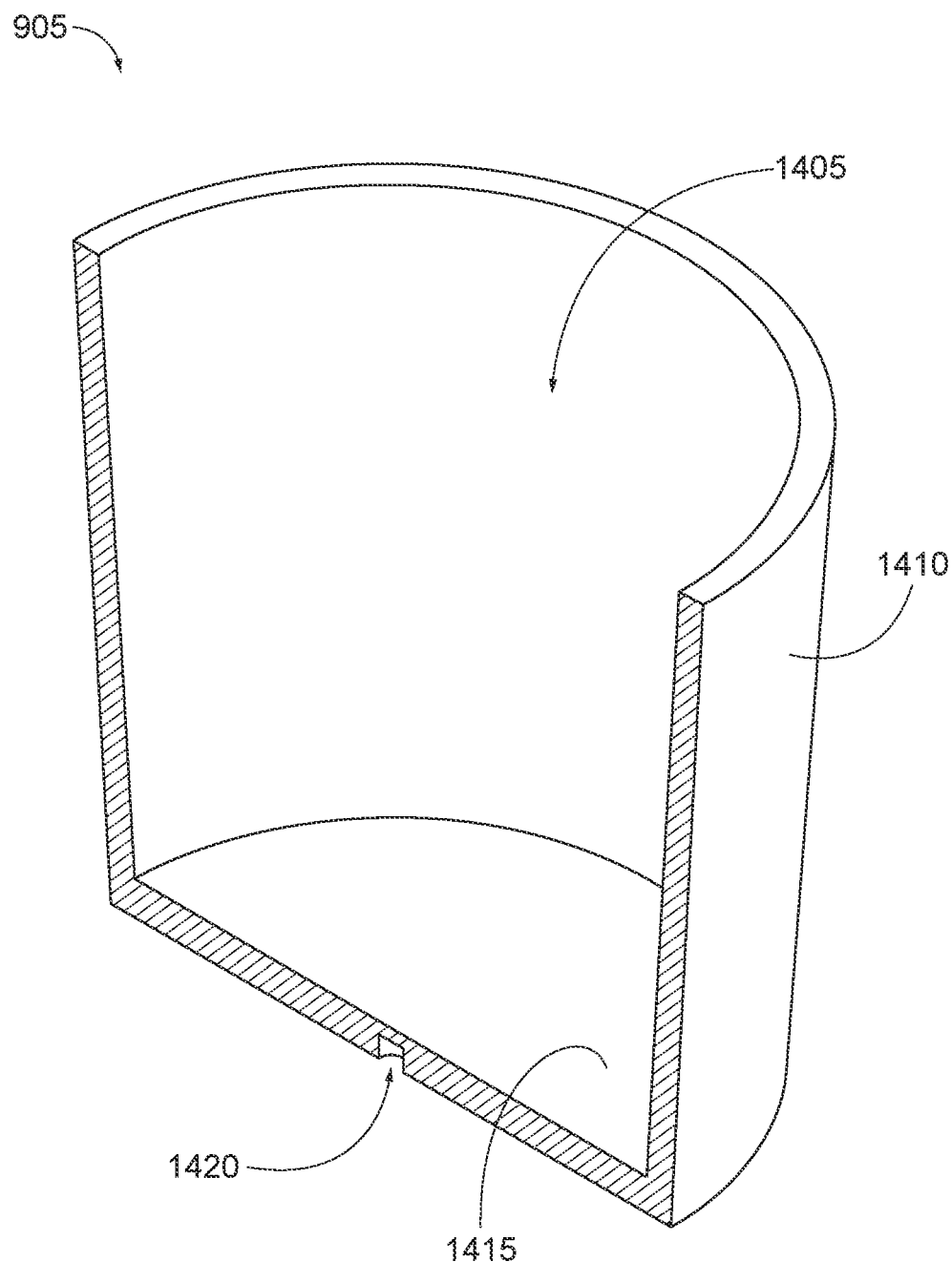
FIG. 14 is a cross-sectional view of a shroud of the base of FIG. 9

Turning to FIG. 14, an example of the shroud 905 is shown. The shroud 905 includes an opening 1405 configured to receive the housing 910. As described previously, the shroud 905 is configured to surround the housing 910 to provide a uniform and/or visually appealing appearance to the vortex generation system 100. The shroud 905 further includes a sidewall 1410 and a bottom 1415 defining the opening 1405. In one example, the bottom 1415 defines an aperture 1420 configured to receive the fastener 925 to secure the shroud 905 to the housing 910.

Figure 15:
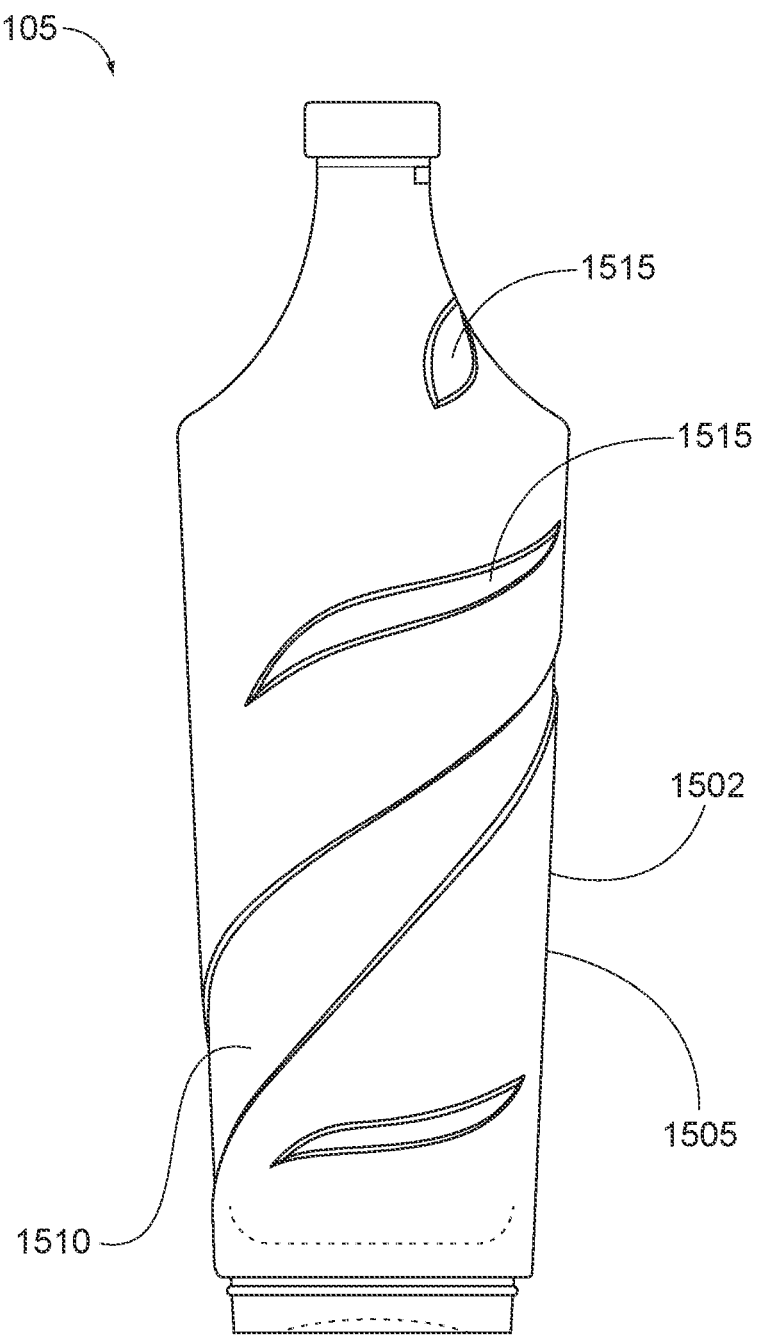
FIG. 15 is a side view of another embodiment of a container of the vortex generation system of FIG. 1.

FIG. 15 shows another embodiment of the container 105 in the form of a bottle 1502. In one embodiment, a body 1505 of the bottle 1502 includes a cutout 1510. The cutout 1510 is configured to receive the wrap 215 of the shroud 210. In one example, the cutout 1510 is cut and/or molded into the bottle 1502 such that the wrap 215 is flush with an exterior surface of the body 1505. In other examples, the bottle 1502 includes one or more designs 1515 configured to generate additional visual interest in the vortex generation system 100.

Figure 16:
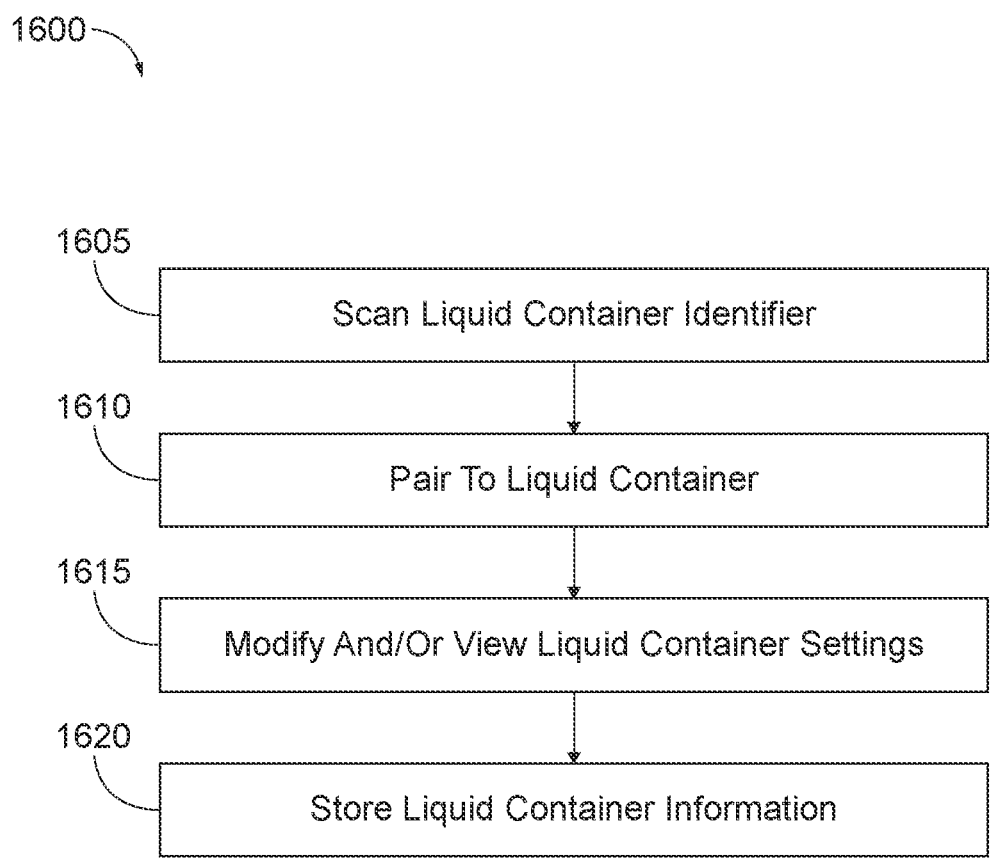
FIG. 16 is a flowchart of a vortex generation system pairing process.

Shown in FIG. 16 is a flowchart 1600 of a process for pairing the mobile device 160 to the base 110 of the vortex generation system 100. At stage 1605 a user uses a sensor to scan the machine-readable identifier 615 on the vortex generation system 100. In one example, the sensor is a camera on a mobile device. In another example, the machine-readable identifier 615 is the barcode 620 and/or a quick response (QR) code located on the vortex generation system 100. At stage 1610, after scanning the vortex generation system 100, the user receives a pairing invitation from the vortex generation system 100. In one example, the pairing invitation is a notification and/or alert on a mobile device. In another example, the invitation is a notification and/or alert sent via a mobile application (App) on the mobile device.

At stage 1615 the user is able to modify and/or view settings of the vortex generation system 100. In one example, the user is able to modify a rotational speed of the motor 125. As should be appreciated, adjusting the rotational speed of the motor 125 affects the vortex within the container 105. For example, when the motor 125 rotates at a higher velocity the vortex is larger and/or more extravagant. In another example, the user lowers the rotational speed of the motor 125 to reduce the size of the vortex. In another example, the user adjusts a brightness and/or color setting of the illumination devices 135. In one embodiment, the user modifies the color of the illumination devices 135 to match the ambient lighting and/or color palette of the establishment. In yet another example, the user sets a timer for the illumination devices 135. For example, the illumination devices 135 are set to turn on during a set time range and are configured to turn off during another time range. In yet another example, the user is able to view the remaining battery life of the base 110.

At stage 1620 the bottle information stored within the memory 150 is sent via a wireless connection to the server 175 via the network 170. In one example, information from the base 110 includes the amount of liquid 520 remaining in the container 105, the battery life of the base 110, the unique identifier for the vortex generation system 100, past order dates for the container 105 and/or stock keeping unit (SKU), and/or other information. Based on the current and/or power drawn by the motor 125, the controller 120 is able to estimate the volume of liquid 520 remaining in the container 105. Alternatively or additionally, the controller 120 estimates the volume of liquid 520 remaining in the container 105 based on the strength, angle, and/or polarity of light reflected off the surface of the liquid 520 (or vortex 525). As should be appreciated, this information is useful to assist in SKU tracking, inventory, consumer demographic data, automatic ordering processes, and/or other uses.

Figure 17:
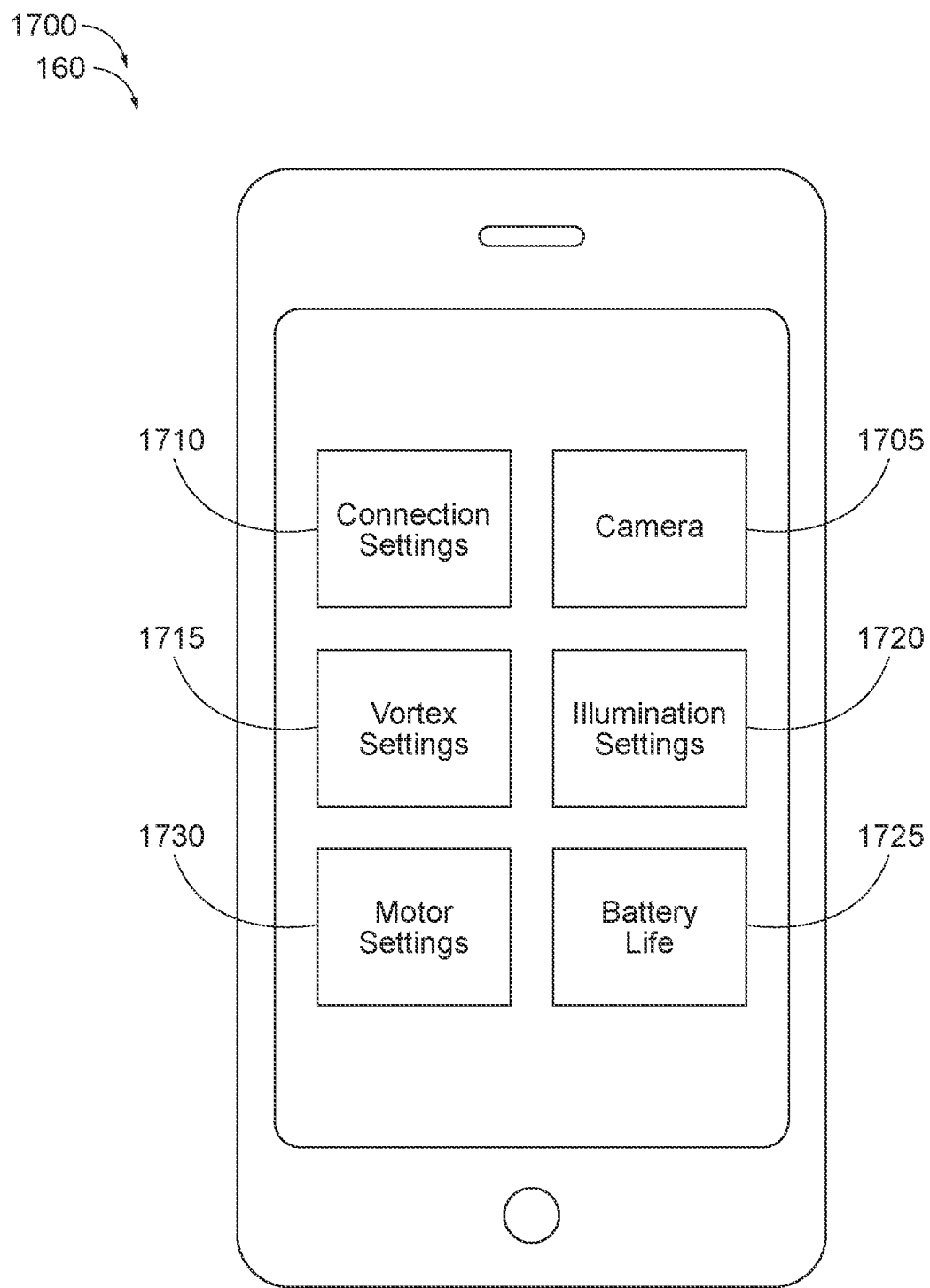
FIG. 17 is a diagrammatic view of a mobile application on a mobile device.

Shown FIG. 17 is an example of a mobile application 1700 on the mobile device 160. In one example, the mobile device 160 is a mobile device, such as a mobile phone, tablet, and/or computer. The mobile application 1700 is configured to enable a user to modify and/or view settings of the vortex generation system 100. For example, the mobile application 1700 includes a camera 1705 configured to scan the unique identifier of the vortex generation system 100. As was mentioned previously, scanning the unique identifier is configured to wirelessly connect the vortex generation system 100 to the mobile device 160. The mobile application 1700 further includes one or more connection settings 1710 configured to enable the user to pair and/or unpair from the vortex generation system 100. In another example, the connection settings 1710 are used to reference previously connected vortex generation system 100. The connection settings 1710 also show a user the connection status of the vortex generation system 100.

The mobile application 1700 further includes one or more vortex settings 1715 configured to enable a user to modify the visual characteristics of the vortex. In one example, the vortex settings 1715 enable a user to generate a larger and/or smaller vortex based on the needs of a user. In another example, the vortex settings 1715 enable a user to modify a pattern and/or outline of the vortex. To further enhance the visual characteristics of the vortex generation system 100, the mobile application 1700 includes one or more illumination settings 1720. The illumination settings 1720 enable a user to adjust the brightness and/or color of the illumination devices 135. The illumination settings 1720 also enable a user to set a time for auto turn on/shut off of the illumination devices 135. In one example, the illumination devices 135 are one or more light emitting diodes 515 located in the base 110.

The mobile application 1700 further enables a user to modify one or more motor settings 1730. The motor settings 1730 enable a user to monitor the running and/or stationary characteristics of the motor 125. In one example, the user slows and/or speeds up rotation of the motor 125 based on the remaining battery life of the base 110. In another example, the user sets threshold values for motor 125 power consumption to preserve battery life. Using one or more battery life settings 1725 enables a user to monitor the remaining battery life of the base 110. In some embodiments, the battery life settings 1725 further enable a user to set the vortex generation system 100 into a low power mode to conserve battery life. In yet another example, the mobile application 1700 is configured send a low battery alert to the mobile device 160 when the battery charge is below 25%.

Figure 18:
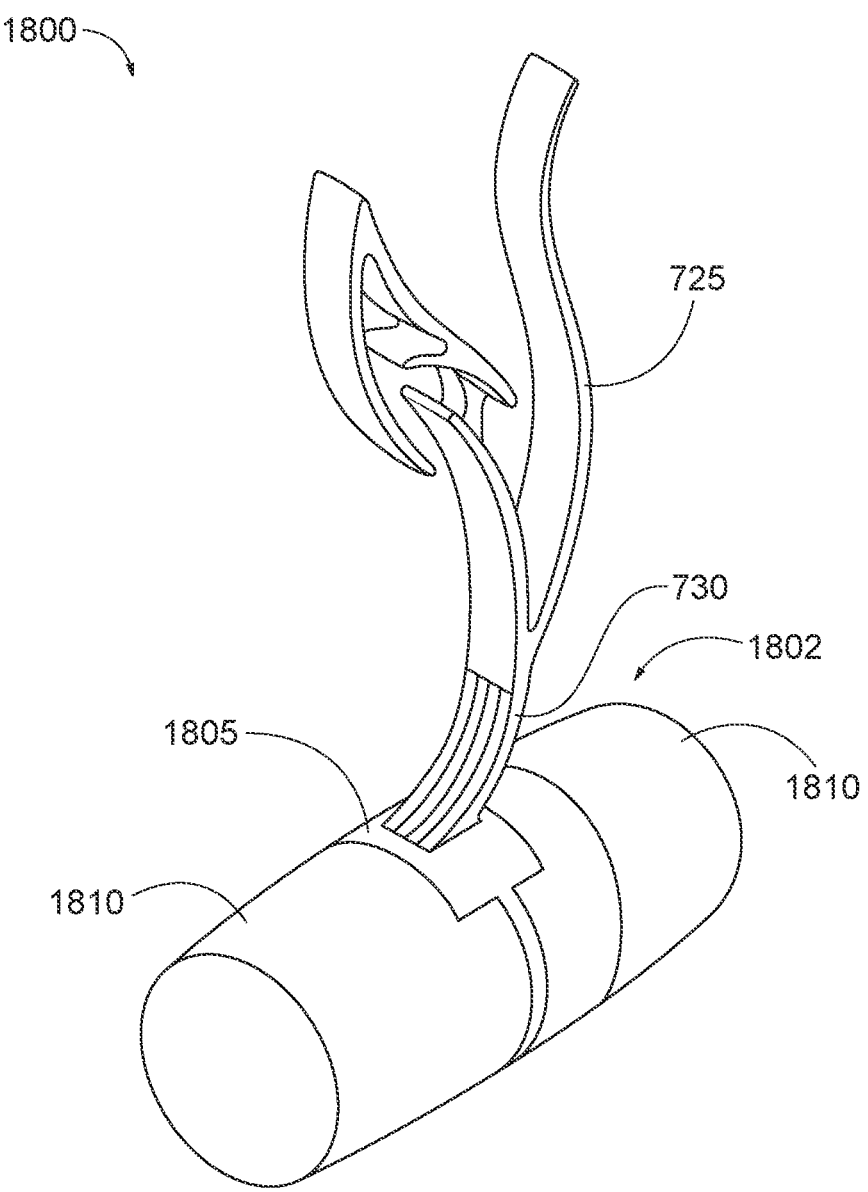
FIG. 18 is a perspective view of another example of an agitator.

FIG. 18 shows an example of an agitator 1800. The agitator 1800 is a designed as a unitary component. Put differently, the blade 725 and a stir bar 1802 are one piece. The agitator 1800 includes the blade 725 extending into the stem 730. The stem 730 further extends into a receptacle 1805. The receptacle 1805 is integral with the blade 725 such that the receptacle 1805 and the blade 725 form a unitary component. The receptacle 1805 is configured to receive and retain one or more magnets 1810. In one example, the magnets 1810 are removable from the receptacle 1805. In another example, the magnets 1810 are fixed to the receptacle 1805 via one or more fasteners, such as adhesive. The magnets 1810 are configured to magnetically interact with the motor 125 of the base 110 to generate the vortex and/or whirlpool effect.

Figure 19:
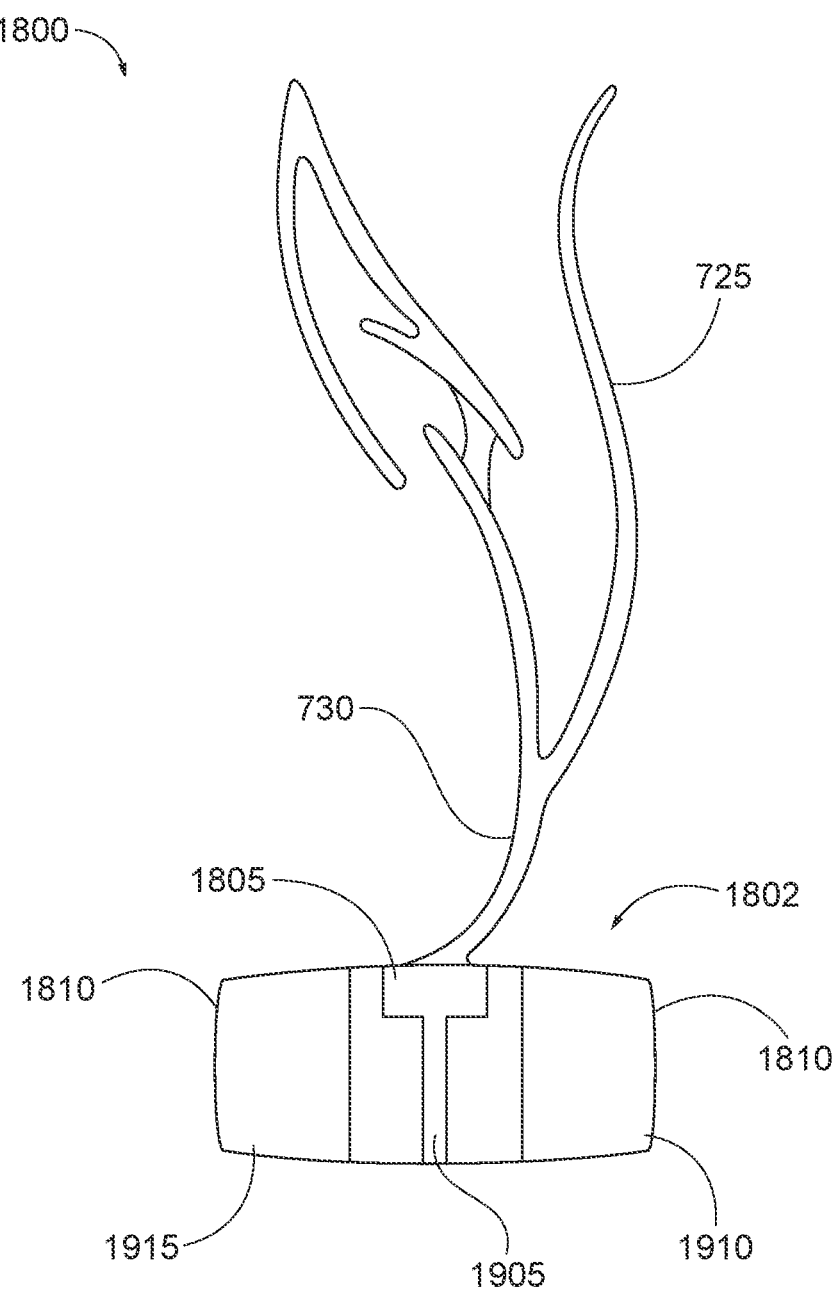
FIG. 19 is a side view of the agitator of FIG. 18.

FIG. 19 shows another view of the agitator 1800. As can be seen, the magnets 1810 are separated from one another via a rib 1905 of the receptacle 1805. In one example, the stir bar 1802 includes a first magnet 1910 and a second magnet 1915 separated by the rib 1905. In one embodiment, the first magnet 1910 and the second magnet 1915 form a magnetic connection through the rib 1905 to secure the first magnet 1910 and the second magnet 1915 within the receptacle 1805.

Figure 20:
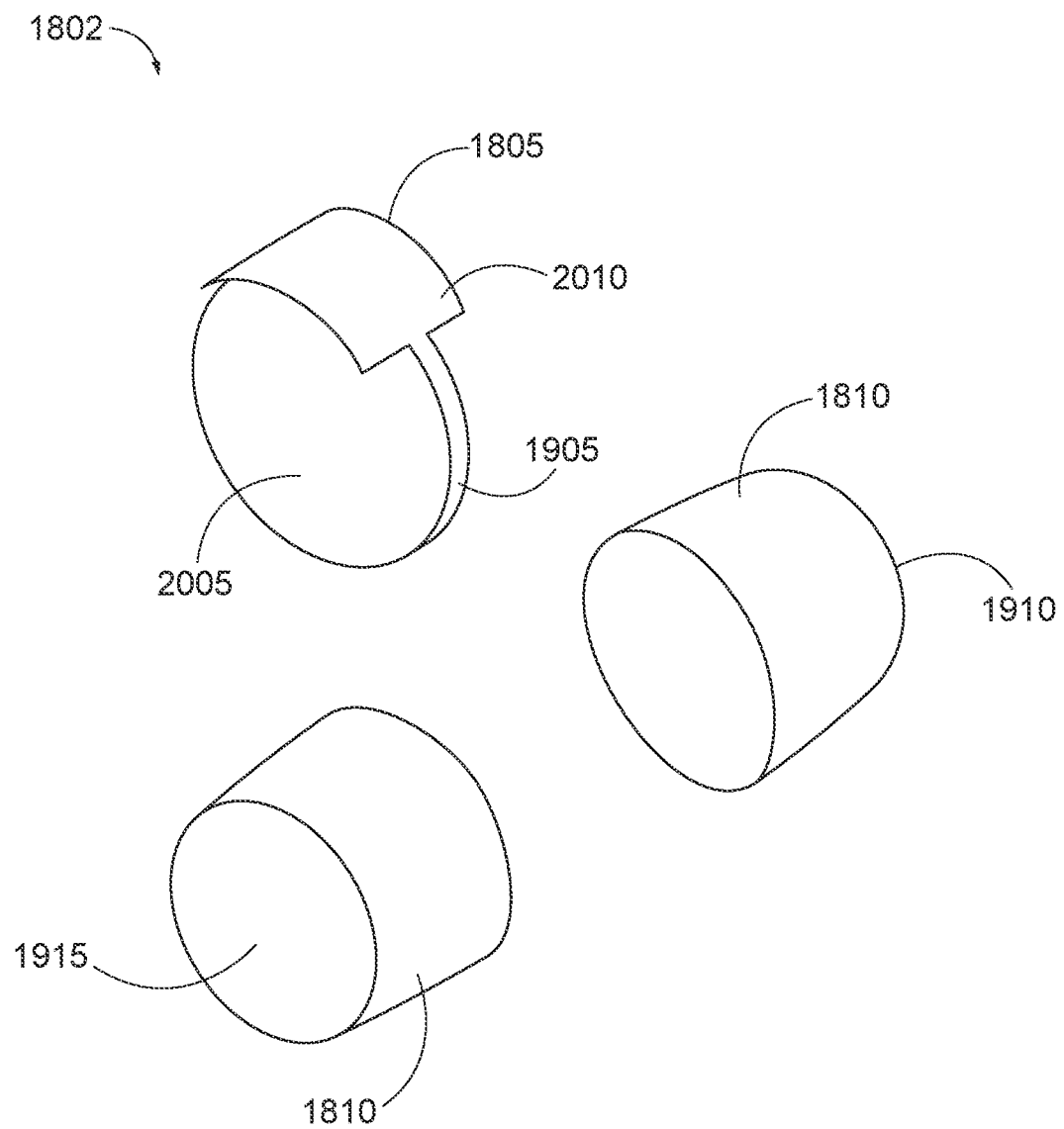
FIG. 20 is an exploded view of a stir bar of the agitator of FIG. 18.

FIG. 20 shows an exploded view of the stir bar 1802. The stir bar 1802 includes the receptacle 1805 and the magnets 1810. The receptacle 1805 is shown to include one or more faces 2005 configured to mate with the magnets 1810. In one example, the magnets 1810 mount to the face 2005 of the receptacle 1805 via adhesive. In another example, the receptacle 1805 is made from a magnetic material such that the magnets 1810 mount to the face 2005 of the receptacle 1805 via a magnetic force. In another example, the receptacle 1805 is made from a polymeric and/or non-magnetic material and the magnets 1810 are secured via adhesive. The magnets 1810 are further secured to the receptacle 1805 via a ledge 2010. In one example, the ledge 2010 is configured to surround a portion of the magnets 1810 to positively retain the magnets 1810 within the receptacle 1805.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example, if the stated value is 4.375, then use of the term "about 4.375" generally means a range between 3.9375 and 4.8125.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Barcode" generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Produce Code (UPC), or any visible patterns related to any type of Automatic Identification and Data Capture (AIDC) system. Another example of a barcode is a Quick Response Code (QR Code) which arranges various light and dark shapes to encode data. Any suitable medium is envisioned. Examples include an adhesive label, a physical page, a display device configured to display the barcode, or any other object such as a box, a machine, or other physical structure to which the barcode is affixed or upon which it is printed. For example, a bar code may be etched into metal, machined into plastic, or formed by organizing visible three-dimensional shapes into a pattern. The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e. "black") light, or barcodes displayed using infrared light.

"Bottle" generally refers to a narrow-necked container made of an impermeable material that stores liquids. Bottles for example can be made from a variety of generally liquid impermeable materials such as glass, plastic, and/or aluminum, and the bottles can be formed in in various shapes and sizes. The bottle can come in the form of a rigid or semirigid container. Typical bottles lack a handle. Bottles normally include a bottom which is referred to as a base or underside. Some bottles, like wine bottles, have an indentation or punt at the bottom. Typically, the bottle has a body that that extends from the bottom, and in most cases, the body has a generally cylindrical shape. A curved or angled transition between the bottom and the body is sometimes referred to as a heel or insweep. The bottle further has a neck that is narrower than the body. For instance, when the body and neck have a generally cylindrical shape, the neck will have radius or diameter that is appreciably smaller than the radius or diameter of the body. Between the body and the neck, the bottle usually has a shoulder that generally accommodates the transition in size between the body and neck. In some case, the shoulder is angled and/or curved between the body and the neck. Normally, the end of the neck that is opposite the bottom of the bottle has a mouth or bore through which the liquid contained in the bottle is poured. Around the mouth, the neck may further include a lip or other finishing structures. At the mouth, the bottle can be sealed with an internal stopper, an external bottle cap, a closure, and/or an induction seal to name a few examples.

"Cellular Device" generally refers to a device which sends or receives data, and/or sends or receives telephone calls using a cellular network. Cellular devices may thus be characterized as nodes in a communications link operating as an originating and/or final receiving node. A cellular device transmits to and receives from a cellular transceiver located in the cell (e.g. at a base unit or "cell tower.") Radio waves are generally used to transfer signals to and from the cellular device on a frequency that is specific (but not necessarily unique) to each cell. A cellular device may include a computer with memory, processor, display device, input/output devices, and so forth, and thus may be used as, and referred to as, a personal computing device.

"Cellular Network" or "Mobile Network" generally refers to a communications link or communications network where the final communications link to an originating sending node or final receiving node in the network is via a wireless link. The cellular network is distributed over land areas ("cells"), each cell served by at least one fixed-location transceiver known as a cell site, base station, or generically, a "cell tower". This base station provides the cell with the network coverage which can be used for transmission of voice, data and other types of communication. In a cellular network, each cell uses a different set of frequencies from neighboring cells, to avoid interference and provide guaranteed bandwidth within each cell. In a cellular network, switching from one cell frequency to a different cell frequency is done electronically without interruption as various mobile devices with transceivers configured to communicate with the network (i.e. the originating or final receiver nodes) move from cell to cell during an ongoing continuous communication, all generally without a base station operator or manual switching. This is called the "handover" or "handoff" Typically, a new channel is automatically selected for the mobile device on the new base station which will serve it as the mobile device moves around in the cell. The mobile unit then automatically switches from the current channel to the new channel and communication continues. The most common example of a cellular network is a mobile phone (cell phone) network.

"Channel" generally refers to a long, narrow groove in a surface of an object.

"Chassis" generally refers to an internal frame and/or supporting structure that supports an external object, body, and/or housing of the vehicle and/or electronic device. In one form, the chassis can further provide protection for internal parts of the vehicle and/or electronic device. By way of non-limiting examples, a chassis can include the underpart of a vehicle, including the frame on which the body is mounted. In an electronic device, the chassis for example includes a frame and/or other internal supporting structure on which one or more circuit boards and/or other electronics are mounted.

"Clear" means substantially non-colored so as to be capable of transmitting substantially white light. Clear here includes not only crystal-clear material, but also milky white material. Clear here includes not only transparent material, but also translucent material. Clear also includes material with or without lenses, ridges and prisms.

"Cloud-based application" generally refers to any program stored on a remote server or group of servers and that is accessible by a network, such as the Internet. The program can be designed to perform any desired function and may be accessible by any device that is capable of accessing the network.

"Communication Link" or "Communication Channel" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Container" generally refers to an object creating a partially or fully enclosed space that can be used to contain, store, and transport objects, items, and/or materials. In other words, a container can include an object that can be used to hold or transport something. By way of non-limiting examples, containers can include boxes, cartons, plastic packaging, totes, bags, jars, envelopes, barrels, cans, bottles, drums, and/or packages.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Couple" or "Coupled" generally refers to an indirect and/or direct connection between the identified elements, components, and/or objects. Often the manner of the coupling will be related specifically to the manner in which the two coupled elements interact.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database", "Knowledge Base", "Data Store", or "Data Repository" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS. Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others. Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA. The database and the DBMS software may also be referred to collectively as a "database". Similarly, the term "database" may also collectively refer to the database, the corresponding DBMS software, and a physical computer or collection of computers. Thus, the term "database" may refer to the data, software for managing the data, and/or a physical computer that includes some or all of the data and/or the software for managing the data.

"Detent" or "Detent Mechanism" generally refers to a device configured to position and hold one mechanical part in relation to another in a manner such that the device can be released by force applied to one of the parts. Some non-limiting examples of detents include a catch, dog, or spring-operated ball.

"Electric Motor" generally refers to an electrical machine that converts electrical energy into mechanical energy. Normally, but not always, electric motors operate through the interaction between one or more magnetic fields in the motor and winding currents to generate force in the form of rotation. Electric motors can be powered by direct current (DC) sources, such as from batteries, motor vehicles, and/or rectifiers, or by alternating current (AC) sources, such as a power grid, inverters, and/or electrical generators. An electric generator can (but not always) be mechanically identical to an electric motor, but operates in the reverse direction, accepting mechanical energy and converting the mechanical energy into electrical energy.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Glass" generally refers to an amorphous material formed from a melt by cooling to rigidity without crystallization. Glass is usually a hard, brittle substance. Typically, but not always, glass is transparent or translucent. Glass is normally made by fusing sand with soda, lime, and sometimes other ingredients and cooling rapidly. Glass can occur synthetically or naturally. For example, glass can be naturally made as obsidian that is produced by fast cooling of magma.

"Hole" generally refers to a hollow portion through a solid body, wall or a surface. A hole may be any shape. For example, a hole may be, but is not limited to, circular, triangular, or rectangular. A hole may also have varying depths and may extend entirely through the solid body or surface or may extend through only one side of the solid body.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Inductive Charging" generally refers to a type of Wireless Power Transfer (WPT) that uses of an electromagnetic field to transfer energy between two objects through electromagnetic induction. Typically, but not always, inductive charging is performed through a charging station. Energy is sent through an inductive coupling to an electrical device, and the transferred energy is then for example used to charge batteries and/or run the device. Induction chargers commonly use a primary induction coil at a power transmitter to create an alternating electromagnetic field from within a charging base, and a secondary induction coil in a power receiver of the portable device or other electrical load takes power from the electromagnetic field and converts the electromagnetic energy back into electric current to charge the battery and/or power the electrical load. In essence, the two induction coils in proximity combine to form an electrical transformer. Greater distances between the coils can be achieved when the wireless charging system uses resonant inductive coupling. For stationary type chargers, inductive charging occurs while the electrical load is stationary relative to the primary coil. Inductive charging in other forms can occur while the vehicle or electrical load is moving relative to the primary coil.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Lamp" generally refers to an electrical device configured to produce light using electrical power. The generated light may be in the visible range, ultraviolet, infrared, or other light. Example illumination technologies that may be employed in a lamp include, but are not limited to, incandescent, halogen, LED, fluorescent, carbon arc, xenon arc, metal-halide, mercury-vapor, sulfur, neon, sodium-vapor, or others.

"Light Emitting Diode" or "LED" generally refers to a semiconductor diode, made from certain materials, in which light is emitted in response to application of an electrical current. A variety of materials in the LED can produce a range of colors. The color of the light (corresponding to the energy of the photons) is determined by the energy required for electrons to cross the band gap of the semiconductor. Typically, but not always, white light is obtained by using multiple semiconductors or a layer of light-emitting phosphor on the semiconductor device. The LED can come in the form of a variety of colors, shapes, sizes and designs, including with or without heat sinking, lenses, or reflectors, built into the package.

"Light" means light which is visible to the naked human eye

"Light Color" means the predominant light color visible to the naked human eye (for example, red, amber, white, blue, green, yellow, purple, or otherwise) even if it is blended with some non-predominant light wave or frequency light.

"Light Transmissive" has the meaning, clear (whether or not color tinted), translucent and/or otherwise such that visible light or infrared light or ultraviolet passes through it.

"Liquid" generally refers to a fluid) that has no independent shape but has a definite volume and does not expand indefinitely and that is only slightly compressible.

"Liquor" or "Spirit" generally refers to an alcoholic drink produced by distillation of grains, fruits, vegetables, and/or sugar, that have already gone through alcoholic fermentation. To name just a few examples, liquor can include vodka, gin, whiskey, bourbon, scotch, and tequila.

"Machine-Readable Identifier" generally refer to a marking, structure, and/or device that is readable by an electronic device such as by a computer with an optical and/or electromagnetic scanner. Typically, but not always, the machine-readable identifier identifies the object and/or some property of the object to which the machine-readable identifier is associated. Unless great effort is used, the machine-readable identifier is not easily read and/or understood by a human being. Some examples of machine-readable identifiers include barcodes, Quick Response (QR) codes, and/or Radio-Frequency Identification (RFID) tags, to name just a few.

"Magnet" generally refers to a material or object that produces a magnetic field external to itself. Types of magnets include permanent magnets and electromagnets. By way of non-limiting examples, magnets in certain circumstances are able to attract (or repel) objects such as those made of iron or steel.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random-Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including Static Random Access Memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change RAM (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Mobile Communication" generally refers to any form of communication that uses cellular network standards to communicate between mobile devices including 1G, 2G, 3G, 4G, 5G, or 6G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards.

"Mobile Device" generally refers to a piece of portable electronic equipment that can connect to a network such as a wireless network, a mobile network, and/or the internet. For instance, a mobile device can include a smartphone or tablet computer.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks. A network may utilize different communication protocols or messaging techniques including layers or stacks of protocols. Examples include the Ethernet protocol, the Internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP Internet Protocol suite may include the application layer, transport layer, Internet layer (including, e.g., IPv6), or link layer.

"Opaque" generally refers to a material and/or article that has the physical property of blocking light or other forms of electromagnetic radiation from passing through the material. The material can be in the form of a solid, liquid, or gas. An opaque material is neither transparent nor translucent. Whether a material is opaque typically depends on the wavelength of the light and the nature of the material. For instance, some kinds of glass, while transparent in the visible light range, are largely opaque to ultraviolet light.

"Plastic" generally refers to a synthetic or semi-synthetic material made from a wide range of organic polymers, such as polyethylene, PVC, nylon, and like. Typically, but not always, plastics are mostly thermoplastic or thermosetting polymers of high molecular weight and that can be made into objects, films, or filaments. In some cases, plastics can be molded into shape while soft and then set into a rigid or slightly elastic form.

"Power Supply" or "Power Source" generally refers to an electrical device that provides electrical power to an electrical load, such as electrical machines and/or electronics.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Rotor" generally refers to a part or portion in a machine that rotates in or around a stationary part, which is commonly referred to as a stator. The rotor is the moving or rotating part of a rotary system, such as found in electric generators, electric motors, sirens, mud motors, turbines, and/or biological rotors. In one particular non-limiting example, the rotor includes the rotating portion of an electric generator and/or motor, especially of an induction motor.

"Server" generally refers to a computer or group of computers that provide(s) data to other computers. It may serve data to systems on a local area network (LAN) or a wide area network (WAN) over the Internet.

"Shroud" generally refers to an object that envelops or obscures another object. In one example, the shroud includes a length of cloth or an enveloping garment that covers an object or a person.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud, and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional, and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap fit connector, protruding edges of one part are pushed away from the target insertion area, and the other part then slides in between the protruding edges until a desired distance is reached. Once the desired distance is reached, the edges are then released such that the part is held in place.

"Spring" generally refers to an elastic object that stores mechanical energy. The spring can include a resilient device that can be pressed, pulled, and/or twisted but returns to its former shape when released. The spring can be made from resilient or elastic material such as metal and/or plastic. The spring can counter or resist loads in many forms and apply force at constant or variable levels. For example, the spring can include a tension spring, compression spring, torsion spring, constant spring, and/or variable spring. The spring can take many forms such as by being a flat spring, a machined spring, and/or a serpentine spring. By way of nonlimiting examples, the springs can include various coil springs, pocket springs, Bonnell coils, offset coils, continuous coils, cantilever springs, volute springs, hairsprings, leaf springs, V-springs, gas springs, leaf springs, torsion springs, rubber bands, spring washers, and/or wave springs, to name just a few.

"Stator" generally refers to a stationary part or portion in a machine in or about which a rotating part revolves, which is commonly referred to as a rotor. The stator is the stationary part of a rotary system, such as found in electric generators, electric motors, sirens, mud motors, turbines, and/or biological rotors. In one particular non-limiting example, the stator includes the stationary portion of an electric generator and/or motor, especially of an induction motor.

"Stock Keeping Unit" (SKU) or "Item" generally refers to an individual article or thing. The SKU can come in any form and can be packaged or unpackaged. For instance, SKUs can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

"Stopper" generally refers to plug for a sealing a hole, especially for at the mouth of a bottle or other container.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Translucent" generally refers to a material and/or article that has the physical property of allowing light or other forms of electromagnetic radiation to pass through the material but appreciable scatters the light so that objects beyond cannot be seen clearly. The material can be in the form of a solid, liquid, or gas. A transparent material is generally made up of components with different indices of refraction. Whether a material is translucent typically depends on the wavelength of the light and the nature of the material. Some examples of translucent materials include some forms of glass and plastics.

"Transparent" generally refers to a material and/or article that has the physical property of allowing light or other forms of electromagnetic radiation to pass through the material without appreciable scattering of light. The material can be in the form of a solid, liquid, or gas. A transparent material is generally made up of components with a uniform index of refraction. Transparent materials appear clear, with the overall appearance of one color, or any combination leading up to a brilliant spectrum of every color. Whether a material is transparent typically depends on the wavelength of the light and the nature of the material. Some examples of transparent materials include some forms of glass and plastics as well as air and liquid water.

"Vortex" generally refers to a region in a fluid in which flow of the fluid revolves around an axis line. The axis line may be straight or curved. The vortex has a mass of fluid, such as a liquid or gas, with a whirling or circular motion that tends to form a cavity or vacuum in the center of the circle, and the vortex action tends to draw the fluid toward this cavity or vacuum.

"Wireless Personal Area Network" or "WPAN" generally refers to a low-powered electromagnetic network used for data transmission between devices, such as computers, telephones, electronics, and/or portable devices, that is carried over a short-distance using network technology with a range of a few centimeters to a few meters. WPAN is based in part on the IEEE 802.15 standard. Two types wireless technologies are typically used for WPAN, BLUETOOTH® and Infrared Data Association (IrDA) technologies. BLU- ETOOTH® technology typically uses short-range radio waves, and in some instances, can form longer range mesh networks. IrDA technology typically uses infrared light for communication. Non-limiting examples of WPAN include INSTEON, IrDA, Wireless USB, BLUETOOTH®, Z-Wave, and ZigBee wireless communication protocols and technologies.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vortex generation system |
| 105 | container |
| 110 | base |
| 115 | seal |
| 120 | controller |
| 125 | motor |
| 130 | agitator |
| 135 | illumination device |
| 140 | power supply |
| 145 | I/O device |
| 150 | memory |
| 155 | wireless transceiver |
| 160 | mobile device |
| 162 | WPAN |
| 165 | network interface |
| 170 | network |
| 175 | server |
| 205 | bottle |
| 207 | body |
| 210 | shroud |
| 215 | wrap |
| 220 | neck |
| 225 | mouth |
| 305 | head |
| 310 | corkscrew |
| 315 | lip |
| 320 | groove |
| 325 | spiral pattern |
| 405 | bottle |
| 410 | body |
| 415 | neck |
| 420 | mouth |
| 425 | shoulder |

| Reference Numbers | |
|---|---|
| 505 | underside |
| 507 | heel |
| 510 | threaded connection |
| 515 | light emitting diode |
| 520 | liquid |
| 525 | vortex |
| 605 | threads |
| 610 | shank |
| 615 | machine-readable identifier |
| 620 | barcode |
| 705 | platform |
| 710 | platform cavity |
| 715 | stir bar |
| 717 | magnet |
| 720 | detent |
| 725 | blade |
| 730 | stem |
| 905 | shroud |
| 910 | housing |
| 915 | first housing component |
| 920 | second housing component |
| 925 | fastener |
| 930 | fasteners |
| 935 | battery |
| 940 | battery terminal |
| 945 | chassis |
| 950 | circuit board |
| 955 | clips |
| 960 | motor mount |
| 965 | fastener |
| 970 | motor |
| 975 | rotor |
| 980 | magnets |
| 985 | machine-readable identifier |
| 990 | barcode |
| 1005 | threads |
| 1010 | ridge |
| 1015 | tray |
| 1205 | port |
| 1210 | seam |
| 1215 | apertures |
| 1220 | channel |
| 1305 | holes |
| 1310 | bottom |
| 1315 | aperture |
| 1320 | window |
| 1405 | opening |
| 1410 | sidewall |
| 1415 | bottom |
| 1420 | aperture |
| 1502 | bottle |
| 1505 | body |
| 1510 | cutout |
| 1515 | designs |
| 1600 | flowchart |
| 1605 | stage |
| 1610 | stage |
| 1615 | stage |
| 1620 | stage |
| 1700 | mobile application |
| 1705 | camera |
| 1710 | connection settings |
| 1715 | vortex settings |
| 1720 | illumination settings |
| 1725 | battery life settings |
| 1730 | motor settings |
| 1800 | agitator |
| 1802 | stir bar |
| 1805 | receptacle |
| 1810 | magnets |
| 1905 | rib |
| 1910 | first magnet |
| 1915 | second magnet |
| 2005 | face |
| 2010 | ledge |

What is claimed is:

1. A system, comprising:
a bottle configured to contain a liquid, wherein the bottle has a body, wherein the body of the bottle defines a cutout;
a base detachably connected to the bottle via a snap-fit connection to prevent separation during routine use;
a shroud wrapping around an interface between the base and the bottle to provide a unitary appearance between the base and the bottle, wherein the shroud has a wrap received in the cutout of the bottle, wherein the wrap is flush with an exterior surface of the body of the bottle;
wherein the base is configured to generate a vortex in the liquid in the bottle; and
wherein the base has an illumination device configured to illuminate the liquid in the bottle.

2. The system of claim 1, wherein the base is configured to indirectly form the vortex without a direct mechanical connection to an interior of the bottle.

3. The system of claim 2, further comprising:
an agitator disposed inside the bottle;
wherein the agitator includes a magnet;
wherein the base includes an electromagnetic stirrer; and
wherein the base is configured to rotate the agitator within the bottle.

4. The system of claim 3, wherein the agitator includes a platform, a blade, and a stem connecting the blade to the platform.

5. The system of claim 4, wherein the stem is configured to bend to fit the agitator into the bottle.

6. The system of claim 4, wherein the blade has a stylized appearance configured to stimulate visual interest.

7. The system of claim 1, wherein:
the base includes a rotor configured to generate a rotating magnetic field to rotate a magnetic stirrer in the bottle; and
the rotor is configured to operate at variable speeds to modify the size and/or shape of the vortex.

8. The system of claim 1, further comprising:
a network; and
a mobile device operatively communicating with the base via the network.

9. The system of claim 1, further comprising:
a mobile device configured to control operation of the base.

10. The system of claim 9, wherein the mobile device is configured to control the vortex.

11. The system of claim 9, wherein the mobile device is configured to control the illumination device.

12. The system of claim 9, wherein the mobile device is configured to pair the bottle with the mobile device.

13. The system of claim 9, wherein the mobile device is configured to pair the base with the mobile device.

14. The system of claim 1, further comprising:
an agitator disposed inside the bottle;
wherein the agitator includes a magnet; and
wherein the base includes a rotor configured to generate a rotating magnetic field to rotate the magnet of the agitator in the bottle to generate the vortex.

15. The system of claim 14, wherein the base includes one or more batteries configured to power the rotor.

16. The system of claim 14, wherein:
the agitator includes a blade and a stem connecting the blade to the magnet; and
the stem is configured to bend to fit the agitator into the bottle.

17. The system of claim 1, wherein:
the cutout extends in a spiral direction around the bottle; and
the wrap extends in the spiral direction around the bottle.

18. The system of claim 1, further comprising:
wherein the bottle has a bottle machine-readable identifier;
wherein the base has a base machine-readable identifier;
a mobile device having a sensor configured to read the bottle machine-readable identifier and the base machine-readable identifier; and
wherein the bottle machine-readable identifier and the base machine-readable identifier are used to pair the bottle and the base for usage tracking purposes.

19. The system of claim 18, wherein the mobile device is configured to control the vortex.

20. The system of claim 18, wherein:
the mobile device is configured to control the illumination device.

21. A method, comprising:
connecting a bottle to a base via a detachable mechanical connection to provide a unitary appearance;
powering the base with a battery housed in the base;
generating a vortex within a liquid held within the bottle;
wherein the generating the vortex includes magnetically spinning an agitator within the bottle via the base;
changing the vortex within the bottle via a mobile device;
illuminating the liquid in the bottle with an illumination device in the base;
adjusting illumination of the liquid in the bottle via the mobile device;
monitoring charge of the battery with the mobile device;
pouring the liquid from the bottle with the base attached the bottle;
detaching the bottle from the base; and
wherein the detaching occurs after the pouring.

22. The method of claim 21, further comprising:
sending data about the bottle from the mobile device to a server.

23. A system, comprising:
a bottle configured to contain a liquid, wherein the bottle has a neck with a mouth;
a base coupled to the bottle;
a shroud wrapping around an interface between the base and the bottle to provide a unitary appearance between the base and the bottle;
wherein the base is configured to generate a vortex in the liquid in the bottle;
wherein the base has an illumination device configured to illuminate the liquid in the bottle;
an agitator disposed inside the bottle, wherein the agitator includes a magnet, a blade, and a stem connecting the blade to the magnet;
wherein the blade has a surface area larger than the stem to generate drag within the liquid to create the vortex;
wherein the stem includes a spring;
wherein the stem is configured to bend to fit the agitator through the mouth and the neck of the bottle;
wherein the blade extends transverse to the magnet when the stem is in an unbent state within the bottle; and
wherein the base includes a rotor configured to generate a rotating magnetic field to rotate the magnet of the agitator in the bottle to generate the vortex.

24. The system of claim 23, wherein:
the bottle has a body;
the body of the bottle defines a cutout;
the cutout extends in a spiral direction around the bottle;
the shroud has a wrap received in the cutout of the bottle;

the wrap is flush with an exterior surface of the body of the bottle; and the wrap extends in the spiral direction around the bottle.

\* \* \* \* \*